US008070579B2

(12) United States Patent
Bienvenue et al.

(10) Patent No.: US 8,070,579 B2
(45) Date of Patent: Dec. 6, 2011

(54) BINGO SYSTEM WITH DOWNLOADABLE COMMON PATTERNS

(75) Inventors: Lesley Bienvenue, Reno, NV (US); Bryan Wolf, Reno, NV (US); Ted Gail, Sparks, NV (US); Tracy Powell, Reno, NV (US); Justin Krum, Reno, NV (US)

(73) Assignee: IGT, Reno, NV (US)

( * ) Notice: Subject to any disclaimer, the term of this patent is extended or adjusted under 35 U.S.C. 154(b) by 1679 days.

(21) Appl. No.: 11/312,966

(22) Filed: Dec. 19, 2005

(65) Prior Publication Data

US 2007/0161423 A1 Jul. 12, 2007

(51) Int. Cl.
*A63F 13/00* (2006.01)
*A63F 9/24* (2006.01)

(52) U.S. Cl. ........................................... 463/16; 463/20

(58) Field of Classification Search .................... 463/19, 463/16, 20–30

See application file for complete search history.

(56) References Cited

U.S. PATENT DOCUMENTS

| | | | | |
|---|---|---|---|---|
| 3,671,041 | A | 6/1972 | Taylor et al. | |
| 4,332,389 | A | 6/1982 | Loyd, Jr. et al. | |
| 4,365,810 | A | 12/1982 | Richardson | |
| 4,373,726 | A | 2/1983 | Churchill et al. | |
| 4,455,025 | A | 6/1984 | Itkis | |
| 4,624,462 | A | 11/1986 | Itkis | |
| 4,798,387 | A | 1/1989 | Richardson | |
| 4,848,771 | A | 7/1989 | Richardson | |
| 4,856,787 | A | 8/1989 | Itkis | |
| 5,007,649 | A | 4/1991 | Richardson | |
| 5,092,598 | A * | 3/1992 | Kamille | 273/139 |
| 5,192,076 | A | 3/1993 | Komori | |
| 5,242,163 | A | 9/1993 | Fulton | |
| 5,297,802 | A | 3/1994 | Pocock et al. | |
| 5,351,970 | A | 10/1994 | Fioretti | |
| 5,393,057 | A | 2/1995 | Marnell, II | |
| 5,407,199 | A * | 4/1995 | Gumina | 273/139 |
| 5,611,729 | A | 3/1997 | Schumacher et al. | |
| 5,639,088 | A | 6/1997 | Schneider et al. | |

(Continued)

FOREIGN PATENT DOCUMENTS

WO 01/99067 12/2001

(Continued)

OTHER PUBLICATIONS

PCT patent application No. PCT/US2006/048064, International Search Report and Written Opinion dated Jul. 5, 2007.

(Continued)

*Primary Examiner* — Masud Ahmed

(74) *Attorney, Agent, or Firm* — Weaver Austin Villeneuve & Sampson LLP

(57) ABSTRACT

Novel methods, devices and systems are described for mapping a variety of Class III game outcomes to a common set of bingo patterns. Each game theme may have a different entertaining display, based upon a corresponding Class III game. Preferably, each game theme will offer game play and paytable percentages closely matching those of the original Class III game. Some implementations provide a system wherein electronic gaming machines presenting entertaining displays of various Class III game themes are linked to a single bingo server. By linking many participating electronic gaming machines to a single server, some implementations of the invention allow all of the progressive contributions to be pooled into one large progressive jackpot, thereby making the game more attractive to players.

24 Claims, 18 Drawing Sheets

U.S. PATENT DOCUMENTS

| | | | | |
|---|---|---|---|---|
| 5,833,540 | A | 11/1998 | Miodunski et al. | |
| 6,012,984 | A | 1/2000 | Roseman | |
| 6,089,978 | A | 7/2000 | Adams | |
| 6,093,100 | A | 7/2000 | Singer et al. | |
| 6,149,156 | A | 11/2000 | Feola | |
| 6,168,521 | B1 | 1/2001 | Luciano et al. | |
| 6,183,361 | B1 | 2/2001 | Cummings et al. | |
| 6,280,325 | B1 | 8/2001 | Fisk | |
| 6,524,185 | B2 | 2/2003 | Lind | |
| 6,537,150 | B1 * | 3/2003 | Luciano et al. | 463/16 |
| 6,569,017 | B2 | 5/2003 | Enzminger et al. | |
| 6,656,044 | B1 | 12/2003 | Lewis | |
| 6,802,776 | B2 | 10/2004 | Lind et al. | |
| 6,840,858 | B2 | 1/2005 | Adams | |
| 7,241,221 | B1 * | 7/2007 | Luciano et al. | 463/20 |
| 7,614,948 | B2 * | 11/2009 | Saffari et al. | 463/19 |
| 7,708,633 | B2 | 5/2010 | Lind et al. | |
| 7,753,774 | B2 | 7/2010 | Gail et al. | |
| 7,798,898 | B2 * | 9/2010 | Luciano et al. | 463/25 |
| 2002/0113369 | A1 | 8/2002 | Weingardt | |
| 2002/0132661 | A1 | 9/2002 | Lind et al. | |
| 2003/0125101 | A1 | 7/2003 | Campo | |
| 2003/0130029 | A1 | 7/2003 | Crumby | |
| 2004/0152508 | A1 | 8/2004 | Lind et al. | |
| 2005/0130730 | A1 | 6/2005 | Lind et al. | |
| 2005/0233798 | A1 | 10/2005 | Van Asdale | |
| 2006/0025197 | A1 * | 2/2006 | Kane et al. | 463/17 |
| 2006/0082056 | A1 * | 4/2006 | Kane et al. | 273/138.1 |
| 2007/0155471 | A1 | 7/2007 | Powell et al. | |
| 2007/0155472 | A1 | 7/2007 | Gail et al. | |
| 2007/0155473 | A1 | 7/2007 | Powell et al. | |
| 2007/0173313 | A1 | 7/2007 | Bienvenue et al. | |

FOREIGN PATENT DOCUMENTS

| | | |
|---|---|---|
| WO | WO 01/99067 | 12/2001 |
| WO | WO 03/085613 | 10/2003 |
| WO | 2004/095383 A1 | 4/2004 |
| WO | WO2007/075401 | 7/2007 |
| WO | WO2007/075486 | 7/2007 |
| WO | WO2007/075582 | 7/2007 |
| WO | WO2007/078828 | 7/2007 |

OTHER PUBLICATIONS

Powell et al., U.S. Appl. No. 11/312,948, "Bingo Gaming Machine Capable of Selecting Different Bingo Pools", filed Dec. 19, 2005.

International Search Report, mailed Aug. 8, 2007 from International Application No. PCT/US2006/047887, 5 pp. including Notification of Transmittal.

Written Opinion of the International Searching Authority, mailed Aug. 8, 2007 from International Application No. PCT/US2006/047887, 7 pp.

International Search Report of the International Searching Authority, mailed Jul. 4, 2007 from International Application No. PCT/US2006/047714, 5 pp including Notification of Transmittal.

Written Opinion of the International Searching Authority, mailed Jul. 4, 2007 from International Application No. PCT/US2006/047714, 6 pp including Notification of Transmittal.

International Search Report, mailed Jul. 6, 2007 from International Application No. PCT/US2006/048264, 5 pp including Notification of Transmittal.

Written Opinion of the International Searching Authority, mailed Jul. 6, 2007 from International Application No. PCT/US2006/048264, 7 pp.

Gail et al., U.S. Appl. No. 11/402,726, "Using Multiple Bingo Cards to Represent Multiple Slot Paylines And Other Class III Game Options", filed Apr. 11, 2006.

Powell et al., U.S. Appl. No. 11/442,029, "Bingo System With Discrete Payout Categories", filed May 26, 2006.

US Office Action dated Oct. 7, 2010 issued in U.S. Appl. No. 11/312,948.

US Office Action dated Nov. 25, 2008 issued in U.S. Appl. No. 11/402,726.

US Final Office Action dated Jul. 1, 2009 issued in U.S. Appl. No. 11/402,726.

US Notice of Allowance and Examiner Interview Summary dated Mar. 1, 2010 issued in U.S. Appl.No. 11/402,726.

US Notice of Allowance and Supplemental Notice of Allowability dated Jun. 3, 2010 issued in U.S. Appl. No. 11/402,726.

US Office Action dated Sep. 3, 2010 issued in U.S. Appl. No. 11/442,029.

US Office Action Final dated Feb. 18, 2011 issued in U.S. Appl. No. 11/442,029.

PCT International Preliminary Report on Patentability and Written Opinion dated Jun. 24, 2008 issued in WO2007/075401 (PCT/US2006/047887).

Chinese First Office Action dated Jan. 22, 2010 issued in CN 200680052457.0.

PCT International Preliminary Report on Patentability and Written Opinion dated Jun. 24, 2008 issued in WO2007/075486 (PCT/US2006/048064).

Chinese First Office Action dated Jan. 29, 2010 issued in CN 200680052896.1.

PCT International Preliminary Report on Patentability and Written Opinion dated Jun. 24, 2008 issued in WO2007/078828 (PCT/US2006/047714).

Chinese First Office Action dated Jan. 22, 2010 issued in CN 200680052834.0.

PCT International Preliminary Report on Patentability and Written Opinion dated Jun. 24, 2008 issued in WO2007/075582 (PCT/US2006/048264).

Chinese First Office Action dated Feb. 12, 2010 issued in CN 200680051371.6.0.

* cited by examiner

| Pay (255) | Pattern (260) | Game 1 (Prob./Balls) (265) | Game 2 (Prob./Balls) (270) | Game 3 (Prob./Balls) (275) |
|---|---|---|---|---|
| 1 | X | .2/40 | .05/25 | .1/33 |

Fig. 2B

280

| Pay (285) | Seed (290) |
|---|---|
| 1 | 0x5A3B29 |
| 1 | 0xF741C |
| 1 | 0x83E61D55 |
| 1 | 0xCE7245A |
| 2 | 0x92185B |
| 2 | 0xDD3622F |
| 2 | 0x384AE |
| 2 | 0x22D9 |
| - | - |
| - | - |
| 50 | 0xC77F5 |
| 50 | 0x148A |
| 60 | 0x33B5 |
| 100 | 0x9C827 |

*Fig. 2C*

| Pay | Pattern | Game 1 (Prob./Balls) | Game 2 (Prob./Balls) | Game 3 (Prob./Balls) | Combined (Prob./Balls) |
|---|---|---|---|---|---|
| 1 | X | .2/40 | .05/25 | .1/33 | .12/33 |

Fig. 3A

350

| Pattern (355) | Max. No. of Balls (360) | Pay (365) |
|---|---|---|
| X | 35 | 1 |
| Y | 30 | 2 |
| V | 25 | 3 |
| U | 22 | 4 |
| O | 20 | 5 |
| / | 10 | 6 |

*Fig. 3C*

BINGO SYSTEM WITH DOWNLOADABLE COMMON PATTERNS

CROSS-REFERENCE TO RELATED APPLICATION

This application is related to U.S. patent application Ser. No. 11/312,948, entitled "Bingo Gaming Machine Capable of Selecting Different Bingo Pools", which is being filed concurrently with this application and which is incorporated herein by reference and for all purposes.

BACKGROUND OF THE INVENTION

The present disclosure relates to gaming networks and, more particularly, to gaming networks for providing multi-player bingo games.

Gaming in the United States is divided into Class I, Class II and Class III games. Class I gaming includes social games played for minimal prizes, or traditional ceremonial games. Class II gaming includes bingo and bingo-like games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pull tab games if played in the same location as bingo games, lotto, punch boards, tip jars, instant bingo, and other games similar to bingo. Class III gaming includes any game that is not a Class I or Class II game, such as a game of chance of the kind typically offered in non-Indian, state-regulated casinos.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

In a typical bingo game, a "ball drop" display indicates randomly-drawn numbers to be used in playing the bingo game. Accordingly, the term "ball drop" or the like will be used herein to signify the random selection of numbers used in a bingo game; accordingly, the numbers themselves will often be referred to as "balls." Those of skill in the art will realize that the numbers used in an electronic bingo game may be displayed in any convenient fashion and that a simulated "ball drop" is merely one such example. The number of balls drawn and the timing of the ball drops may vary according to the type of bingo game.

As indicated above, a bingo game is played until at least one player covers a predetermined game-winning pattern on the player's bingo card. The game may also include interim winners of prizes based on matching predetermined interim patterns on the bingo card using the same ball draw. The interim pattern wins do not terminate the bingo game. For interim pattern awards, players covering certain interim patterns may receive an additional award as the game continues. Some exceptional bingo versions may allow bingo draws beyond those needed to achieve the bingo game win so as to pay out interim pattern wins at a desired rate. The game-winning awards are generally pari-mutuel in nature. That is, the bingo win award is based upon the total amount wagered on a given occurrence of the bingo game. However, interim pattern awards typically are not pari-mutuel.

Gaming machines such as slot machines and video poker machines have proven to be very popular. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo.

As such, it would be desirable to provide a gaming system wherein a Class II game may be played on a gaming machine with at least some of the "look and feel" of a Class III game. For example, prior art systems have failed to provide a bingo game on a network of gaming machines that satisfies the regulatory requirements for a Class II game while simulating important aspects of a Class III game.

SUMMARY OF THE INVENTION

Novel methods, devices and systems are described for mapping a variety of Class III game outcomes to a common set of bingo patterns. Each game theme may have a different entertaining display, based upon a corresponding Class III game. Preferably, each game theme will offer game play and paytable percentages closely matching those of the original Class III game. Some implementations provide a system wherein electronic gaming machines presenting entertaining displays of various Class III game themes are linked to a single bingo server. By linking many participating electronic gaming machines to a single server, some implementations of the invention allow all of the progressive contributions to be pooled into one large progressive jackpot, thereby making the bingo game more exciting and attractive to players.

Some aspects of the invention involve a method of forming data sets for providing games of chance. One such method includes these steps: selecting first through $N^{th}$ Class III games; forming a global payout set consisting of all payouts of the first through $N^{th}$ Class III games, wherein each payout has a payout probability; ranking each payout in the global payout set according to payout amount; assigning at least one bingo pattern to each payout of the global payout set, thereby forming a global bingo payout set; and calculating a maximum quantity of bingo numbers that may be randomly selected for each of the bingo patterns until a first probability of hitting each bingo pattern is approximately equal to a second probability of achieving a payout associated with the bingo pattern. The first probability may be a probability of hitting a first bingo pattern without hitting a second higher-level pattern.

The method may also include the steps of forming a Class III game payout set for each of the first through $N^{th}$ Class III games and associating at least one Class III game outcome with each payout of each Class III game payout set, thereby forming first through $N^{th}$ theme-specific data sets. The calculating step may be performed at least once for each pay level of a Class III game. In some implementations, the calculating step is also performed for each bet level of each Class III game.

The assigning step may involve assigning only one bingo pattern to each payout of the global payout set or assigning more than one bingo pattern to each payout of the global payout set.

The method may also include these steps: selecting an additional Class III game; forming an additional theme-specific data set for the additional Class III game; and determining whether each payout of the additional Class III game is a member of the global payout set. The method can include the step of forming an updated global bingo payout set when it is determined that at least one payout of the additional Class III game is not a member of the global payout set. The process of forming an updated global bingo payout set may involve these steps: assigning a new bingo pattern to each additional payout of the additional Class III game that was not previously a member of the global bingo payout set; and calculating a maximum quantity of bingo numbers that may be randomly selected for each of the bingo patterns of the updated global bingo payout set until a first probability of hitting each bingo pattern is approximately equal to a second probability of achieving a payout associated with the bingo pattern.

Alternative gaming methods of the invention involve the following steps: choosing first through $N^{th}$ Class III games; forming a Class III game payout set for each of the first through $N^{th}$ Class III games, each payout set comprising all payout amounts of a corresponding Class III game; forming first through $N^{th}$ theme-specific data sets by associating at least one Class III game outcome with each payout of each Class III game payout set; forming a global payout set consisting of all payouts of the first through $N^{th}$ Class III games; assigning at least one bingo pattern to each payout of the global payout set, thereby forming a global bingo payout set; and providing the global bingo payout set and at least one theme-specific data set to each of a first plurality of electronic gaming machines. The associating step may involve assigning at least one random number generator ("RNG") seed to each payout of each Class III game payout set.

The assigning step may comprise assigning only one bingo pattern to each payout of the global payout set. Alternatively, the assigning step may comprise assigning more than one bingo pattern to each payout of the global payout set.

The step of forming Class III game payout sets may comprise assigning a probability for each payout of each of the first through $N^{th}$ Class III games. In some such implementations, the step may involve assigning a probability for each payout and each bet level of each of the first through $N^{th}$ Class III games.

The gaming method may involve conducting a bingo game that includes participating electronic gaming machines of the first plurality of electronic gaming machines. Each of the participating electronic gaming machines may simulate a Class III game outcome corresponding with a payout of a bingo pattern resulting from playing the bingo game on the participating electronic gaming machine.

Some implementations of the gaming method also involve calculating a probability of each payout of the global bingo payout set, the probability being independent of a Class III game theme.

The providing step may involve downloading the global bingo payout set and at least one theme-specific data set to each of the first plurality of electronic gaming machines.

Some methods provide for additional Class III game theme, e.g., by performing these steps: choosing an additional Class III game; forming an additional theme-specific data set for the additional Class III game; and determining whether each payout of the additional Class III game is a member of the global payout set.

According to some implementations of the invention, the probability assigned each payout of the global bingo payout set is dependent on a Class III game theme selected by a player. Some aspects of the gaming method involve determining non-theme bingo patterns of the global bingo payout set that are not included in a theme-specific data set of a game theme and making the non-theme bingo patterns "inactive" while a gaming machine is running the Class III game theme. For example, the non-theme bingo patterns may be rendered inactive by making the probability of hitting these patterns in a required number of balls drawn to be a very small probability. This may be accomplished, e.g., by requiring that the non-theme bingo patterns by hit in a number of balls drawn that is equal to the number of spots on the non-theme bingo patterns and/or by requiring that the balls be drawn in a predetermined sequence.

However, alternative aspects of the invention make the probability of hitting a particular bingo pattern the same, regardless of the Class III game theme being played. According to such implementations, a first probability of attaining a bingo pattern of the global bingo payout set while playing a first participating gaming machine that is running a first Class III game theme is equal to a second probability of attaining the bingo pattern while playing a second participating gaming machine that is running a second Class III game theme.

When it is determined that at least one payout of the additional Class III game is not a member of the global payout set, such implementations may involve forming an updated global payout set and providing the updated global payout set to each of the first plurality of electronic gaming machines. Alternatively, such implementations may involve determining updates for a previously-downloaded global payout set and providing the updates to each of the first plurality of electronic gaming machines. Each of the updates preferably comprises at least one additional bingo pattern and a corresponding payout.

Some gaming methods of the invention include the following steps: receiving a global bingo payout set comprising all payouts of first through $N^{th}$ Class III games and a bingo pattern associated with each payout; receiving at least one theme-specific data set, comprising each Class III payout of a Class III game and at least one Class III game outcome associated with each Class III payout; and providing a bingo game that simulates a Class III game. The providing step includes the following: mapping a bingo pattern achieved during the bingo game with an associated payout of the global bingo payout set; randomly selecting a Class III game outcome for the associated payout; and displaying the Class III game outcome.

The gaming method may include the step of determining whether more than one pattern of the global bingo payout set is achieved during the bingo game. The gaming method may also include these steps: determining that the associated payout is not equal to any Class III payout of the theme-specific data set; selecting a Class III payout of the theme-specific data set that is approximately equal to, but less than, the associated payout; determining a difference between the associated payout and the Class III payout; and awarding the Class III payout and the difference between the associated payout and the Class III payout.

The gaming method may include the step of determining, when more than one pattern of the global bingo payout set is achieved during the bingo game, which achieved bingo pattern is a highest-ranked bingo pattern and awarding a payout associated with the highest-ranked bingo pattern. In preferred implementations, the awarding step comprises awarding only the payout associated with the highest-ranked bingo pattern.

Alternative gaming methods of the invention include the following steps: receiving a global bingo payout set comprising all payouts of first through $N^{th}$ Class III games and a bingo pattern associated with each payout; receiving a theme-specific data set comprising each Class III payout of one of the first through $N^{th}$ Class III games, a corresponding bingo pattern and a maximum number of balls that may be drawn for the corresponding bingo pattern; determining non-theme bingo patterns of the global bingo payout set that are not members of the theme-specific data set; and setting a maximum number of balls that may be drawn for each of the non-theme bingo patterns to be a number of spots of the non-theme bingo pattern.

The theme-specific data set may include a probability for each Class III payout and each bet level of the Class III game. The gaming method preferably involves receiving at least one Class III game outcome associated with each Class III payout. Accordingly, such implementations of the gaming method can involve providing a bingo game that simulates a Class III game. The providing step can include the following: mapping a bingo pattern achieved during the bingo game with an associated payout of the global bingo payout set; randomly selecting a Class III game outcome for the associated payout; and displaying the Class III game outcome.

Alternative gaming methods for providing a bingo game that simulates a Class III game are provided by the invention. Some such methods emulate Class III game play by providing a plurality of "interim win" bingo patterns that must be hit in varying numbers of balls drawn. One such method involves these steps: determining that a bingo pattern achieved during the bingo game was achieved in no more than a predetermined maximum number of bingo balls drawn; mapping the bingo pattern to an associated payout; randomly selecting a Class III game outcome corresponding to the associated payout; and displaying the Class III game outcome. The predetermined maximum number of bingo balls drawn is specific to the bingo pattern.

The present invention provides hardware (such as gaming machines, network devices and components of such devices) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

FIG. 2B illustrates a bingo pattern, an associated payout amount and other data that may be used to implement some aspects of the invention.

FIG. 2C illustrates one example of a theme-specific data set that may be used to implement some aspects of the invention.

FIG. 3A illustrates a bingo pattern, an associated payout amount and other data that may be used to implement some aspects of the invention.

FIG. 3C illustrates bingo patterns, associated payout amounts and other data that may be used to implement some aspects of the invention.

DETAILED DESCRIPTION OF THE INVENTION

Figure 1:
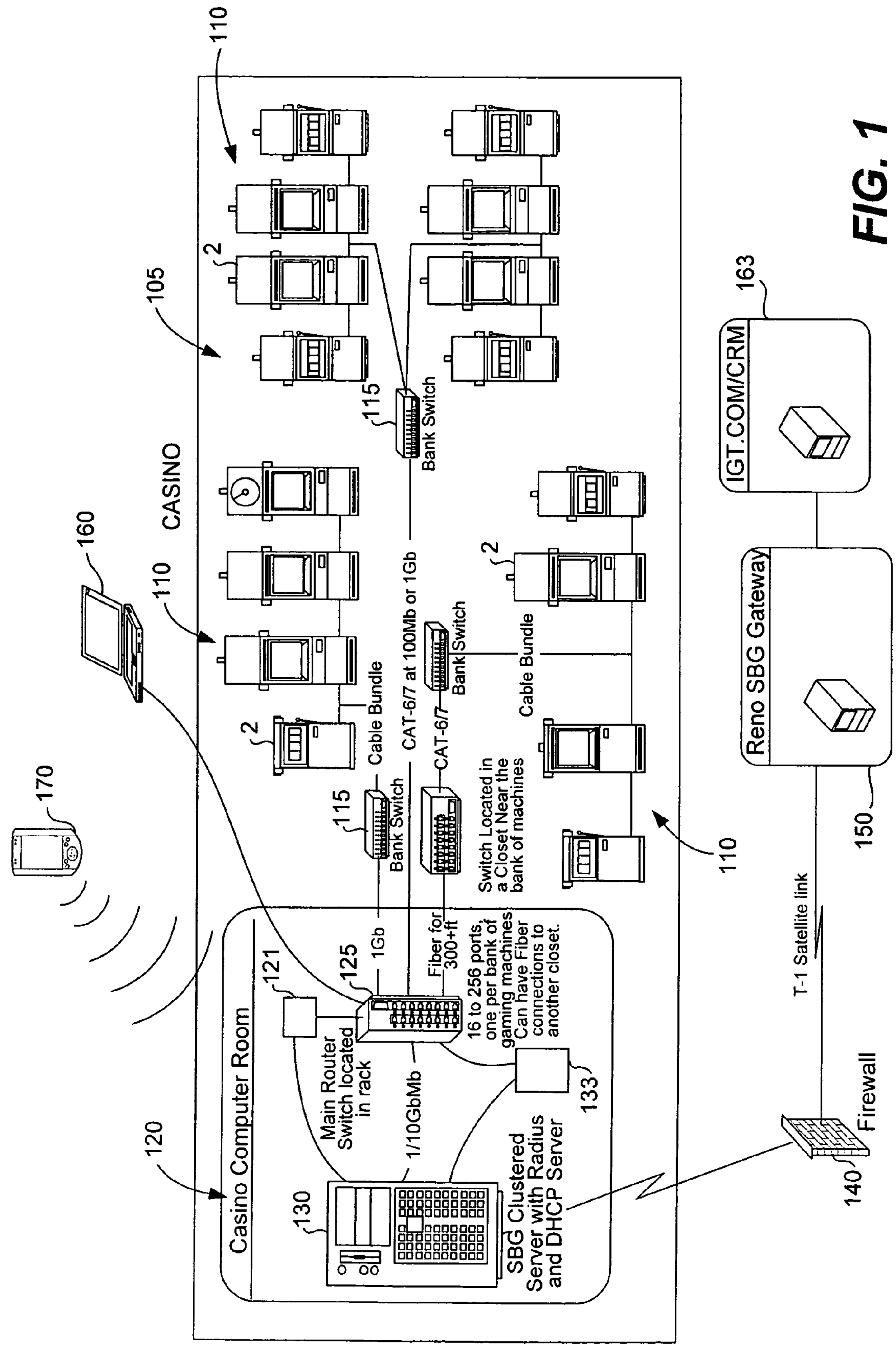
FIG. 1 illustrates one example of a network topology for implementing some aspects of the present invention.
Figure 1A:
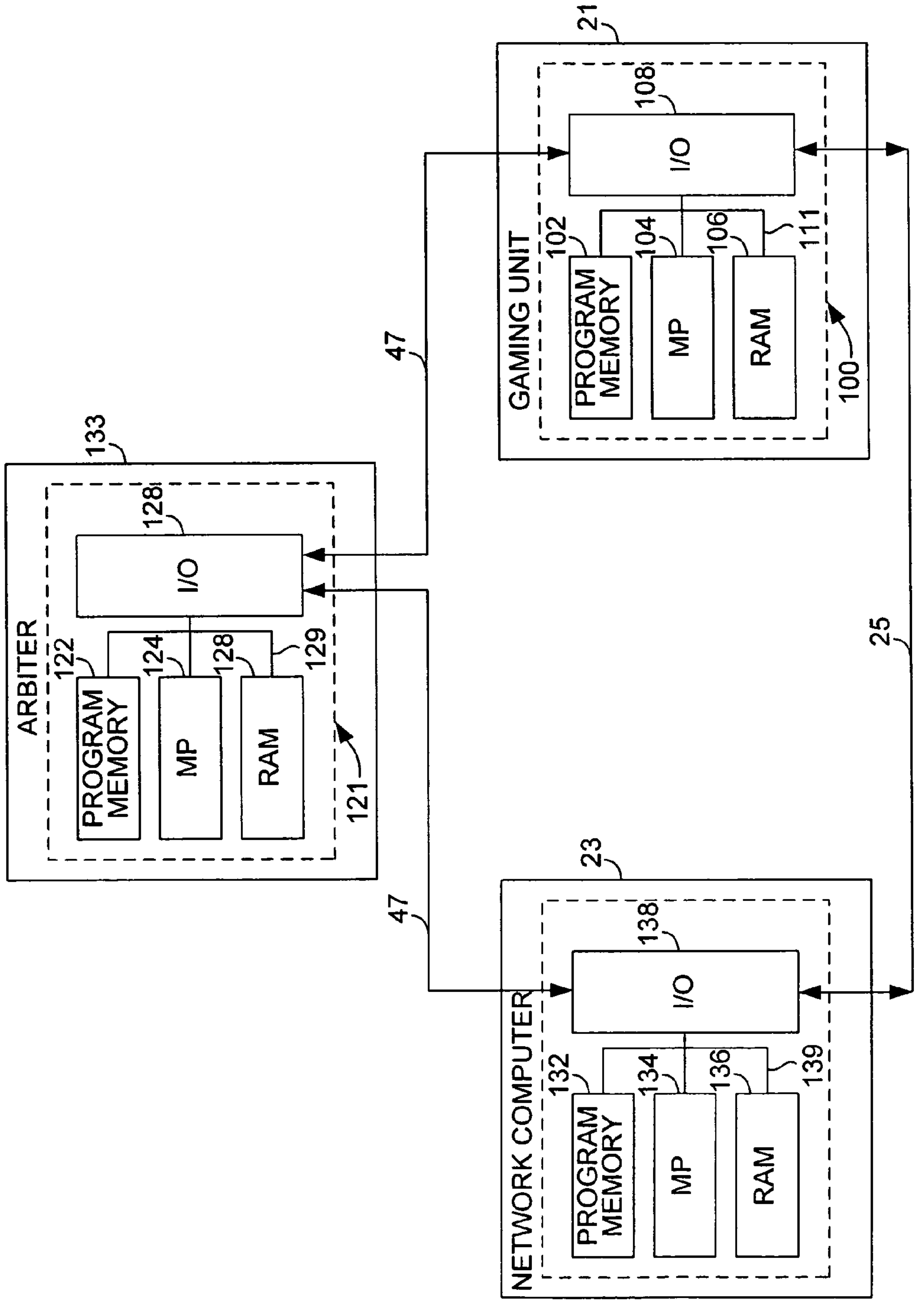
FIG. 1A is a block diagram that illustrates a simplified network topology that illustrates some implementations of an Arbiter.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention describes a variety of implementations for mapping Class III game outcomes to a common set of bingo patterns. According to some such implementations, bingo players may choose from a variety of Class III game themes, each theme having a different entertaining display adapted from a corresponding Class III game. Preferably, each Class III game theme will offer play and win dynamics and paytable percentages closely matching those of the original Class III game.

Some implementations provide a system wherein a plurality of electronic gaming machines, each of which is configured for presenting entertaining displays of various Class III game themes, is linked to a single bingo server. By linking many participating electronic gaming machines to a single server, some implementations of the invention allow progressive contributions from all of the participating electronic gaming machines to be pooled into a single progressive jackpot.

Some embodiments of the invention involve gaming machines that are configured with a graphical user interface ("GUI") or the like that allows a player to select a Class III game theme from a plurality of Class III game themes. In some such embodiments, the gaming machine is configured to present any of the proffered Class III game themes.

Alternatively, or additionally, the game theme of a particular networked gaming machine (or a group of networked gaming machines) may be changed according to instructions received from a central system: some gaming networks described herein include a central system that is configured to download game software and data, including but not limited to the underlying bingo patterns, pays and game outcomes, to networked gaming machines. Such gaming networks allow for the convenient provisioning of networked gaming machines.

Moreover, such gaming networks allow additional game themes to be easily and conveniently added, if desired. If a new game theme requires new bingo patterns to match new payout amounts, preferred implementations of the invention allow a new pattern set (or updates to an old pattern set) to be downloaded to all networked gaming machines. Related software, including but not limited to game software, may be downloaded to networked gaming machines. Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some exemplary gaming networks and devices are below.

EXEMPLARY SYSTEM ARCHITECTURE

One example of a network topology for implementing some aspects of the present invention is shown in FIG. 1. Those of skill in the art will realize that this exemplary architecture and the related functionality are merely examples and that the present invention encompasses many other such embodiments and methods. Here, for example, a single gaming establishment 105 is illustrated, which is a casino in this example. However, it should be understood that some implementations of the present invention involve multiple gaming establishments.

Gaming establishment 105 includes 16 gaming machines 2, each of which is part of a bank 110 of gaming machines 2. It will be appreciated that many gaming establishments include hundreds or even thousands of gaming machines 2, not all of which are included in a bank 110. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 125, which combines switching and routing functionality in this example) and/or the inclusion of other network devices not shown in FIG. 1. For example, some implementations of the invention include one or more middleware servers disposed between gaming machines 2 and server 130. Such middleware servers can provide various useful functions, including but not limited to the filtering and/or aggregation of data received from bank switches 115, from individual gaming machines and from other player terminals. Some implementations of the invention include load balancing methods and devices for managing network traffic.

Each bank 110 has a corresponding bank switch 115, which may be a conventional bank switch. Each bank switch is connected to server-based gaming ("SBG") server 130 via main network device 125, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 130, License Manager 131, Arbiter 133 and main network device 125 are disposed within computer room 120 of gaming establishment 105. License Manager 131 may be implemented, at least in part, via a server or a similar device. Some exemplary operations of License Manager 131 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 130 can be configured to implement, at least in part, various aspects of the present invention. Some preferred embodiments of SBG server 130 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 131 and main network device 125) are mounted in a single rack with SBG server 130. Accordingly, many or all such devices will sometimes be referenced in the aggregate as an "SBG server." However, in alternative implementations, one or more of these devices is in communication with SBG server 130 but located elsewhere. For example, some of the devices could be mounted in separate racks within computer room 120 or located elsewhere on the network. For example, it can be advantageous to store large volumes of data elsewhere via a storage area network ("SAN").

In some embodiments, these components are SBG server 130 preferably has an uninterruptible power supply ("UPS"). The UPS may be, for example, a rack-mounted UPS module.

Computer room 120 may include one or more operator consoles or other host devices that are configured for communication with SBG server 130. Such host devices may be provided with software, hardware and/or firmware for implementing various aspects of the invention; many of these aspects involve controlling SBG server 130. However, such host devices need not be located within computer room 120. Wired host device 160 (which is a laptop computer in this example) and wireless host device (which is a PDA in this example) may be located elsewhere in gaming establishment 105 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Wireless devices are particularly useful for managing a gaming network. Such wireless devices could include, but are not limited to, laptops, PDAs or even cellular telephones. Referring once again to FIG. 1, one or more network devices in gaming establishment 105 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 105 and the outside world should only be made with trusted devices via a secure link, e.g., via a virtual private network ("VPN") tunnel. For example, the illustrated connection between SBG 130, gateway 150 and central system 163 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 163 (in this example, IGT.com) to obtain the account information such as the customer's current and prior account status.

Moreover, such a secure connection may be used by the central system 163 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 163 may notify a local SBG server regarding new products and/or product updates. For example, central system 163 may notify a local SBG server regarding updates of new gaming software, gaming software updates, peripheral updates, the status of current gaming software licenses, etc. In some implementations of the invention, central system 163 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 163 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 163 and the gaming establishments.

Adapting Class III Games to Class II

Various methods and devices will be described herein for presenting Class II games (primarily bingo games) with entertaining displays that simulate Class III games. The following applications describe pertinent material and are hereby incorporated by reference: U.S. patent application Ser. No. 10/925,710, entitled "Draw Bingo" and filed on Aug. 24, 2004; U.S. patent application Ser. No. 10/937,227, entitled "Bingo Game Morphed to Display Non-Bingo Outcomes" and filed on Sep. 8, 2004; and U.S. patent application Ser. No. 11/149,828, entitled "Perrius Poker and Other Bingo Game Variations" and filed on Jun. 10, 2005.

Figure 2A:
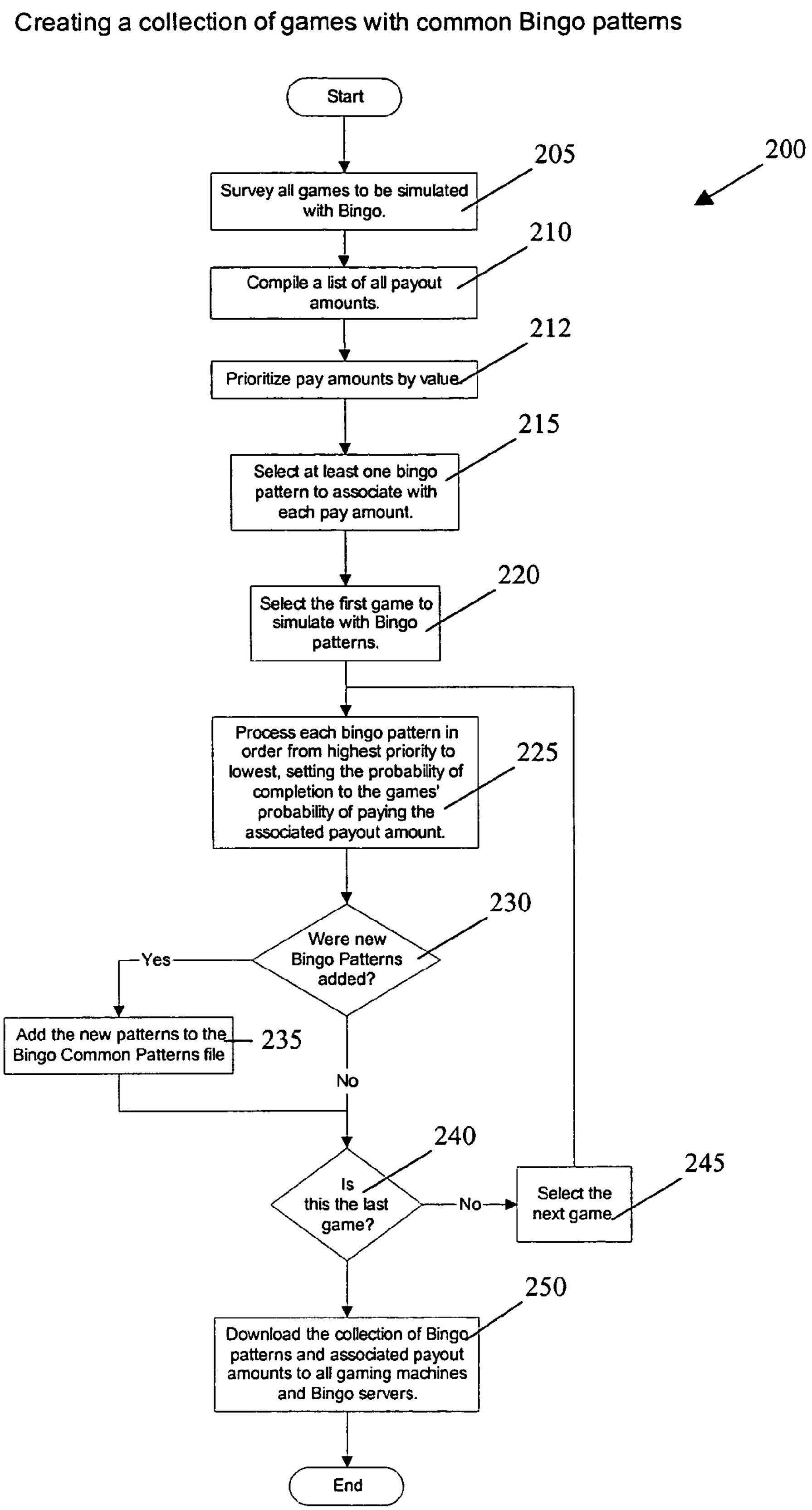
FIG. 2A is a flow chart that outlines one method of the invention.

The present invention provides yet more novel techniques for mapping bingo outcomes to Class III outcomes, assigning the appropriate pays and probabilities, etc. One such method 200 will now be described with reference to the flow chart of FIG. 2A. Method 200 is one exemplary method of creating a collection of games (including but not limited to Class III games) having a set of common bingo patterns. Those of skill in the art will appreciate that the steps of the methods described herein, including but not limited to method 200, are not necessarily performed (and in some implementations are not performed) in the order shown. Moreover, some implementations of the methods described herein, including but not limited to method 200, may include more or fewer steps than those shown and/or described.

In step 205, Class III game themes are selected for adapting to a bingo game. For example, various permutations of video poker games, slot games, etc., may be selected in step 205. For each game selected, a list of the most common or most desired payout amounts is generated (step 210). A set of payouts for a particular game will sometimes be referred to herein as a "game payout set" or the like, whereas a set of payouts pertaining to all games being processed will sometimes be referred to herein as a "global payout set" or the like. In order to facilitate the sorting and pattern-mapping processes, it is helpful to prioritize the payouts by value. (Step 212.)

In step 215, at least one bingo pattern (preferably a single bingo pattern) is associated with each payout amount. In preferred implementations of the invention, these bingo patterns and the corresponding payouts will be offered on all games, even if a particular game theme does not normally include some such payouts. Methods for dealing with such instances are described below with reference to FIG. 2C.

According to method 200, separate probabilities may be calculated for hitting each bingo pattern in each simulated Class III game. In preferred implementations of the invention, for each such game the probability of a bingo pattern being formed or "hit" is controlled by adjusting the maximum number of balls that may be drawn in order to form the pattern. (Step 225.) If a bingo pattern is formed after more than the maximum indicated number of balls has been drawn, the bingo pattern will not count.

In some implementations of the invention, the processing of step 225 (or the like) is performed multiple times for each simulated Class III game. According to some such implementations, this processing is performed for each bet level of each simulated Class III game. In these implementations, the bingo patterns corresponding to pay amounts of the simulated Class III game are assigned different probabilities for each bet level of the game. The process is analogous to the processes described in U.S. patent application Ser. No. 11/312,948, entitled "Bingo Gaming Machine Capable of Selecting Different Bingo Pools", with regard to assigning a different set of probabilities for different numbers of lines played in a simulated slot game.

Moreover, in some preferred implementations of the invention, bingo patterns are prioritized such that if two or more patterns are hit, only the highest-priority pattern can result in a payout. Preferably, patterns are prioritized by pay amount such that if more than one bingo pattern is hit, only the highest payout associated with any of the bingo patterns is paid.

In alternative implementations, however, more than one such pattern can result in a payout. For example, some implementations may include certain bingo patterns that will always result in a payout, even if another higher-priority bingo pattern results in a payout. Still other implementations give a player the option of either selecting (a/k/a "daubing") a pattern when hit or waiting for a higher-level pattern to be hit. In some such implementations, the player will not receive any payout from un-daubed patterns.

The probability of that payout amount is known from the Class III game to be simulated. The number of balls drawn for that pattern is set to approximate the Class III probability as closely as possible. For example, if a 'U' shaped pattern is associated with a payout of 15 credits and the Class III game has a probability of 0.0015 of paying 15 credits, then the number of balls drawn to hit the 'U' shaped pattern is adjusted so that the probability of completing the pattern within the required number of balls drawn is 0.0015, or approximately 0.0015. An exemplary method 400 of assigning probabilities to bingo patterns by adjusting the allowed number of balls drawn to complete the pattern is described below with reference to FIG. 4.

The resulting set of patterns and pay amounts represents the union of all pay amounts across all games. Therefore, within each game, there will be some patterns with pay amounts that are not possible to hit. Some Class III games do not have the same payouts as other Class III games. Accordingly, in step 230, it is determined whether new bingo patterns were added for the current game that were not used for any previous game. For the first game to be processed, the determination will be "No" because only payouts and corresponding bingo patterns for the first game will have been considered. Therefore, the process will continue to step 240.

Because multiple games are being processed in this example, the next game will be selected (step 245) and step 225 will be performed for all of the payouts of the next game. If the determination of step 230 is "Yes" for a game, the new bingo pattern or patterns are added to the set of common bingo patterns (step 235). In some implementations of the invention, the probabilities of those patterns being hit will be minimized, e.g., by requiring the pattern to be hit in the minimum possible number of balls and/or in a specified order.

After it is determined in step 240 that the last game has been processed, the collection of bingo patterns and associated payout amounts may be used, e.g., by downloading them to participating bingo servers, SBG servers and/or gaming machines. (Step 250.)

FIG. 2B illustrates a portion of a data structure 252 that will sometimes be referenced herein as a "global bingo payout set" or the like. According to some implementations of the invention, such a global bingo payout set is populated by applying method 200 of the invention. In this simple example, only a single bingo pattern, "X," is included in pattern field 260. As noted in pay field 255, pattern X pays one credit. Accordingly, only those entries pertaining to pattern X and a payout of 1 are included in FIG. 2B.

Only 3 Class III game themes are included in this example. One of skill in the art will realize that there are thousands of Class III game themes and that data corresponding to many other such game themes could be included in data structure 252. Fields 265, 270 and 275 indicate the probabilities of hitting pattern X within a stated maximum number of balls dropped for games 1, 2 and 3, respectively. For example, in game one, the X pattern must be hit within 40 balls dropped for a payout of 1. The calculated probability of this event is 0.2.

In some implementations, the calculated probabilities are not provided to gaming machines: the gaming machine simply "knows" that a particular pattern needs to be hit in the indicated number of balls in order to potentially obtain a corresponding payout (assuming that no higher-level pattern is hit). In still other implementations, only the pattern and the maximum number of balls for each game theme are provided to gaming machines in advance. According to such implementations, the gaming machines report to a game server when a pattern is hit within a predetermined number of balls. If no higher-level pattern is hit on the gaming machine's bingo card, the game server instructs the gaming machine how much to pay out.

There will normally be many outcomes on the Class III game that pay a particular amount. For example, for a particular type of video poker game, a full house may pay 10 credits. However, there are many different instances of a full house in the game of poker. In some game themes, there may be more than one general type of outcome that corresponds to a particular payout, e.g., of 10 credits. In some implementations of the invention, all such outcomes for that game theme are associated with a single probability of paying 10 credits. As mentioned elsewhere herein, the single probability may differ according to the wager amount. Preferably, there is only 1 bingo pattern associated with that 10-credit payout.

FIG. 2C provides a simplified example of a data structure 280 that may be used to map pays with game outcomes. Such a data set will sometimes be referred to herein as a "theme-specific data set" or the like, because the data in the data set (in this example, pays and outcomes) are specific to a game theme: pay field 285 lists all possible pay amounts for a game theme and outcome field 290 lists data pertaining to game outcomes. Theme-specific data sets may include other types of data, such as probability data, bingo pattern data, etc. As described elsewhere herein, some implementations of the invention assign theme-specific probabilities for each payout (and, in some instances, each bet level) of a game theme. It will be appreciated that the small sample shown in FIG. 2C includes far fewer pays and game outcomes than that which will be associated with an actual Class III game. In some implementations, the number of outcomes that will be stored for a particular Class III game theme will be on the order of $10^4$ to $10^7$ outcomes.

The data in outcome field 290 are used to produce entertaining displays that correspond with payouts of the game theme being played on a gaming machine. When a bingo pattern has been hit and a gaming machine will pay out a particular amount, that pay amount is looked up field 285 of data structure 280. This process may occur, for example, when a game-ending pattern is hit or when an "interim win" pattern is hit.

Various methods may be used to indicate what game outcomes will be displayed by a particular gaming machine. In some preferred implementations, game outcomes are generated using one or more RNG (random number generator) seeds, each of which will provide a known outcome. U.S. Pat. No. 6,533,664, entitled "Gaming System with Individualized Centrally Generated Random Number Generator Seeds," describes the use of RNG seeds and is hereby incorporated by reference for all purposes. Each of the RNG seeds is pre-calculated to produce a predetermined outcome when processed by a pre-programmed "deterministic RNG." The RNG seeds are advantageous for security purposes. Moreover, they are easy to implement because most existing gaming machines use an RNG. Replacing this with a deterministic RNG allows central determination games to be implemented with minimal changes to existing Class III machines.

Using RNG seeds to indicate what bingo card, Class III game outcomes, etc., will be used by a particular gaming machine is generally more efficient than using, for example, a table of numbers/desired outcomes/desired displays. However, in other embodiments, such game data may be transmitted from the game server to gaming machines in the form of a number, a combination of symbols, etc., each of which corresponds to a game feature (e.g., a Class III game outcome). Any convenient method may be used to distribute game features and other game data (e.g., ball drop data) from the game server and no RNG seed is required. In fact, some gaming machines may not have any RNG capability, or this capability may be disabled in order to satisfy gaming regulators.

In preferred implementations, theme-specific data sets are stored on the gaming machine running the theme. The gaming machine will select a game outcome that corresponds to a pay amount associated with the completed bingo pattern.

However, in alternative implementations, another device (such as a bingo server or a device accessible to the bingo server) could store theme-specific data sets and select a corresponding outcome. It may be slower to have another device (e.g. a server) communicate the outcomes to a gaming machine than to have the gaming machine select previously-stored outcomes (e.g., by transmitting selected RNG seeds). However, a central system device such as a server (or an associated storage device) could store a larger range of outcomes than could conveniently be stored on a gaming machine at the present time. For example, such a device could conveniently store on the order of $10^9$ outcomes for each theme-specific data set instead of the $10^6$ or so that are stored on a gaming machine according to some implementations. Such implementations are also advantageous because there could be a single copy of each theme-specific data set on the central device instead of having copies distributed among many gaming machines.

There will normally be many outcomes corresponding to a particular pay amount (e.g., for the pay amount of "1" in data structure 280). In many implementations, an outcome (e.g., in the form of an RNG seed) is randomly selected out of all the available seeds associated with that pay amount and used to seed the entertaining display. However, in some implementations, an outcome will be selected from a subset of the possible outcomes corresponding to an indicated pay amount.

For example, if a simulated video poker game permits a player to draw and hold cards, the outcome needs to be consistent with the cards held and drawn.

As noted above, the global bingo payout set will often include payouts that are not common to all Class III game themes being played during a particular bingo game. Therefore, a bingo pattern will sometimes be hit for which there is no corresponding payout in a theme-specific data set. In some implementations of the invention, the next lowest pay amount is used and a game outcome is selected and presented for that pay amount. The difference between the bingo pay amount and the entertaining display pay amount may be presented on the entertaining display as an additional win, a bonus, a "bingo win" or the like.

For example, suppose that a bingo pattern is hit on a gaming machine that pays 52 according to the global bingo payout set. Suppose further that the gaming machine is running a game theme having a theme-specific data set that (like theme-specific data set 280 of FIG. 2C) has at least one entry for payouts of 50 but no entry for a payout of 52. According to some implementations of the invention, a game outcome is randomly selected that corresponds to a payout of 50. The player is paid the remainder of 2 as a supplemental win (e.g., a "bingo win") and a corresponding display is presented, e.g.: "Congratulations! You win an extra 2 credits!"

In alternative implementations of the invention, only those bingo patterns that correspond to payouts of the Class III game theme being played are "active." All other bingo patterns are "inactive." For example, a bingo pattern may be rendered "inactive" by making the probability of hitting that pattern very low, e.g., by requiring that maximum allowable number of balls drawn to hit the bingo pattern be set equal to the number of spots in the pattern and/or by requiring that the spots be hit in a predetermined sequence.

In some such implementations, each participating gaming machine includes a copy of a global bingo patterns file. Each Class III game theme has its own theme-specific bingo patterns file corresponding to pay amounts for that particular Class III game theme. When the Class III game theme is loaded, both files are merged into one pattern set. If there are bingo patterns in the global bingo patterns file that are not in the theme-specific bingo patterns file, these bingo patterns are made inactive. In some such implementations, the probability of hitting these inactive bingo patterns is made so low that their effect is not considered in computing the overall payback percentage.

According to some implementations of the invention, the probability of hitting a bingo pattern while playing any of the simulated Class III game themes is the same. According to some such implementations, a global bingo payout set may be created by averaging the probabilities and maximum numbers of balls dropped that have been calculated for each pay amount according to method 200 or the like. For example, referring to global bingo payout set 252 of FIG. 3A, the probabilities and maximum numbers of balls dropped that have been calculated for game themes 1, 2 and 3 (the entries in one row of fields 265, 270 and 270) may be averaged. The averaging process may be a simple averaging process or any convenient type of weighted averaging. For example, it may be advantageous to apply a lower weight to games with a probability/payout curve that is unlike other games, to apply a higher weight to more popular games, etc. The resulting probability and maximum number of balls dropped from a simple averaging process are depicted in field 300.

Figure 3B:
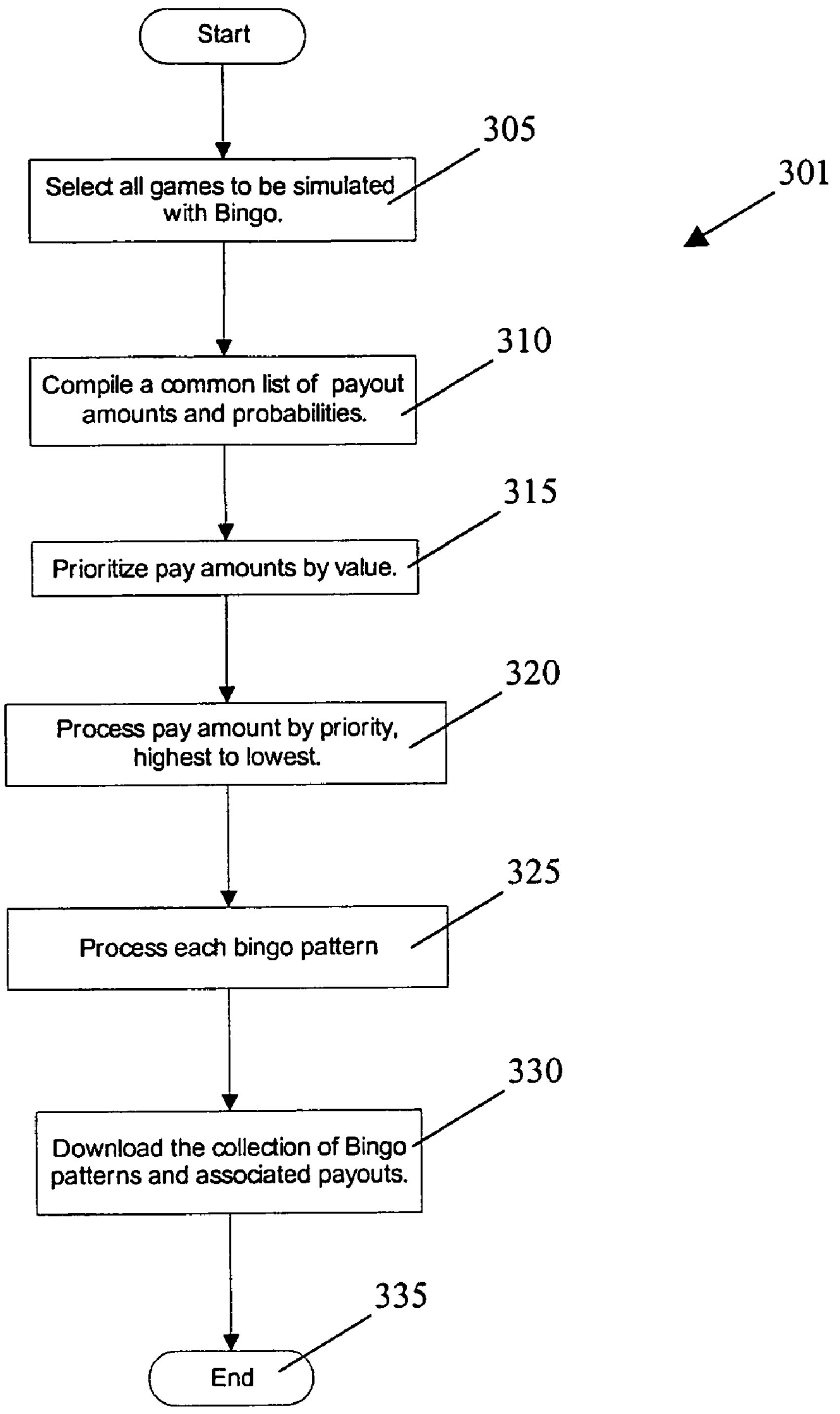
FIG. 3B is a flow chart that outlines one method of the invention.

Method 301, for creating a global bingo payout set from "scratch" according to another such implementation of the invention, will now be described with reference to FIG. 3B. As before, one begins by selecting the Class III games to be simulated in a bingo game. (Step 305.) A global payout set is compiled that includes all payout amounts from the Class III games to be simulated and the corresponding probabilities. (Step 310.) As noted above, different game themes may assign different probabilities for the same pay amount. If there is more than one probability for a corresponding payout, the probabilities can be averaged according to any convenient method to produce a single probability for that pay amount.

In step 315, the pay amounts are prioritized by value. Preferably, the highest pay amount is assigned the highest priority and the lowest pay amount is assigned the lowest priority. For each pay amount, one or more bingo patterns are then selected to be associated with that pay amount. (Step 320.) Preferably, only one bingo pattern is associated with each pay amount.

For each bingo pattern, a determination is made of the number of balls drawn within which the bingo pattern must be completed. (Step 325.) This determination is made such that the probability of completing the bingo pattern matches the games' averaged probability of paying the associated payout amount. An exemplary method 400 of assigning probabilities to bingo patterns by using a binary search method is described below with reference to FIG. 4.

After the foregoing steps are completed, the resulting global bingo payout set may be provided to gaming establishments and/or to networked gaming machines. (Step 330.) As noted above, the information that will need to be provided to individual gaming machines depends on the implementation. In step 335, the process ends.

One exemplary format for part of a global bingo payout set that may be formed according to method 301 is depicted in FIG. 3C. Global bingo payout set 350 includes fields 355, 360 and 370 for indicating bingo patterns, maximum numbers of balls and pay amounts, respectively. The patterns, pay amounts, etc., depicted in FIG. 3C are somewhat arbitrarily defined. However, in this example, increasing pay amounts correspond with decreasing maximum numbers of balls allowed for hitting a pattern. This relationship will depend, of course, on the relative complexity of the bingo pattern that needs to be hit in order to obtain a corresponding pay amount.

Global bingo payout set 350 could be provided to gaming machines, for example, for implementations in which the gaming machines are making a payout determination. The gaming machines would also be provided with any necessary theme-specific data sets, as noted above, and randomly select game outcomes that correspond with indicated pay amounts.

Figure 4:
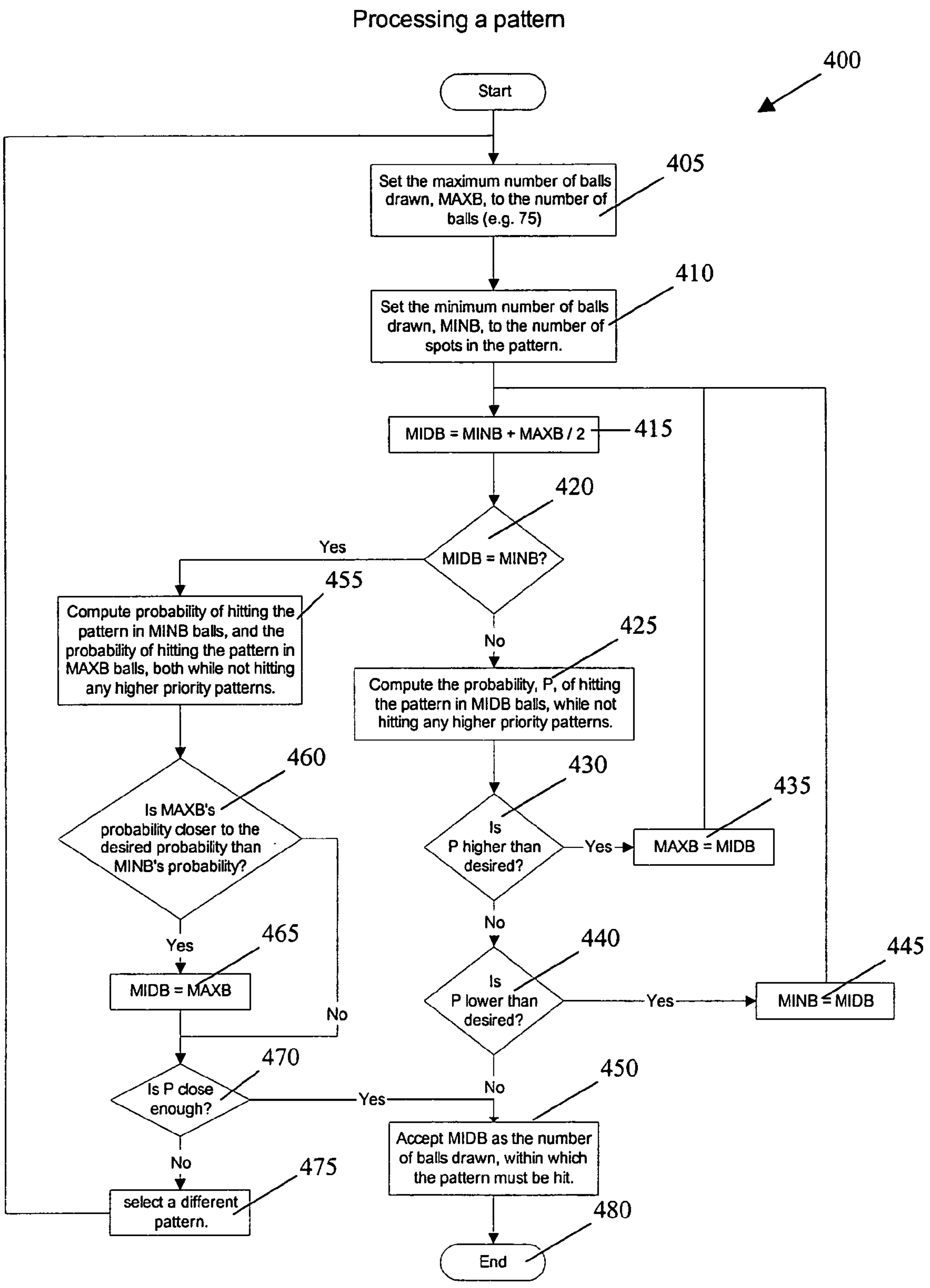
FIG. 4 is a flow chart that outlines one method of the invention.

An exemplary method 400 of assigning probabilities to bingo patterns by using a binary search method will now be described with reference to FIG. 4. However, it will be appreciated by those of skill in the art that other methods, including but not limited to iterative, recursive and analytical methods, may be used for matching a target probability (or an acceptable range of probabilities) with a maximum number of balls that are allowed to be drawn for hitting a bingo pattern. The target probability is that assigned to a payout of one or more Class III game themes.

The upper and lower bounds for the binary search will be referred to as MAXB and MINB, respectively. In step 405, MAXB is first set to be the maximum number of balls that may be drawn. In this example, patterns will be prepared assuming a bingo game wherein 75 balls are dropped. MINB is initialized as the minimum number of balls that are in the pattern under consideration. (Step 410.) For example, if the bingo pattern under consideration is an "X" pattern on a 25-spot bingo card, MINB would initially be set to 9.

In step 415, MINB and MAXB are averaged to determine the midpoint MIDB between the upper and lower bounds of the search. For example, (75+9)/2=84/2=42. Preferably, if the resulting value of MIDB is not a whole number, step 415 also involves rounding MIDB up or down to the nearest whole number.

In step 420, it is determined whether MIDB=MINB. In this example, MIDB does not equal MINB, so the probability P of hitting the bingo pattern (here, an X) in MIDB balls without hitting any higher-priority patterns is calculated. (Step 425). Although this process is represented as a single step in FIG. 4, the actual calculation can involve many steps. The details of such calculations are described below (with reference to FIGS. 5B, 6 and 7) for a simple scenario involving three bingo patterns and a 9-spot bingo card.

In step 430, it is determined whether the calculated probability P is higher than desired, as compared to the target probability. In some preferred implementations of the invention, it is determined whether the P is within a range of probabilities that includes the target probability. If P is too high, MAXB is set to MIDB and the process returns to step 415. If P is not too high, the process continues to step 440.

In step 440, it is determined whether the calculated probability P is too low, as compared to the target probability. If P is too low, MINB is set to MIDB and the process returns to step 415. If P is not too low, the current value of MIDB is accepted as the number of balls drawn within which the pattern must be hit. (Step 450).

If it is determined in step 420 that MIDB=MINB, so the probability of hitting the bingo pattern in MINB balls without hitting any higher-priority patterns is calculated. (Step 455). The probability of hitting the bingo pattern in MAXB balls without hitting any higher-priority patterns is also calculated in step 455. In step 460, it is determined whether MAXB's probability is closer to the target probability than MINB's probability. If so, MIDB is set to MAXB. (Step 465.) In step 470, it is determined whether MAXB's probability is close enough to the target probability. If so, the current value of MIDB is accepted as the number of balls drawn within which the pattern must be hit. (Step 450). If not, a new pattern is selected (step 475) and the process returns to step 405.

Figure 5A:
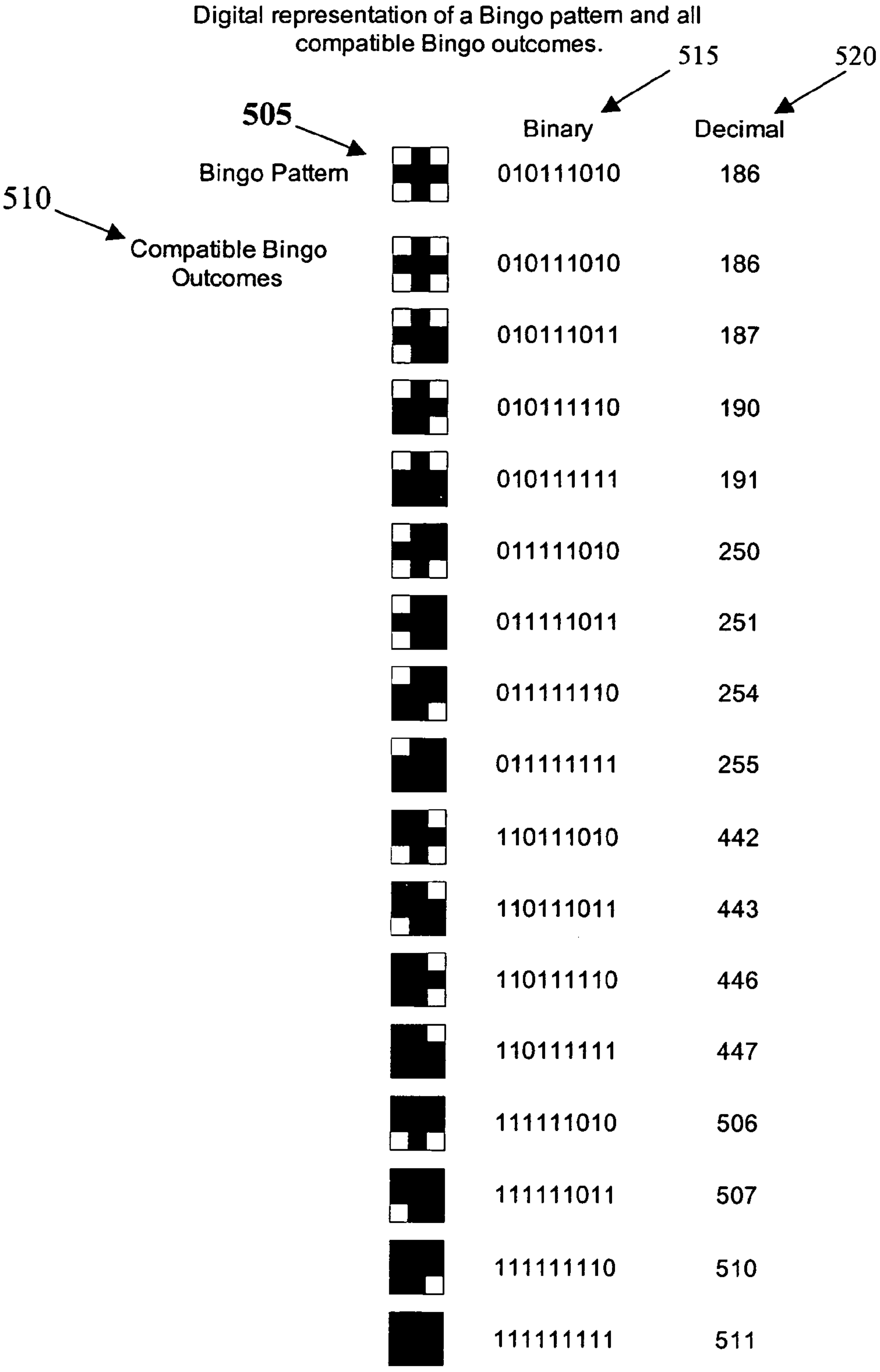
FIG. 5A provides examples of bingo patterns, compatible bingo outcomes and numerical representations thereof.
Figure 5B:
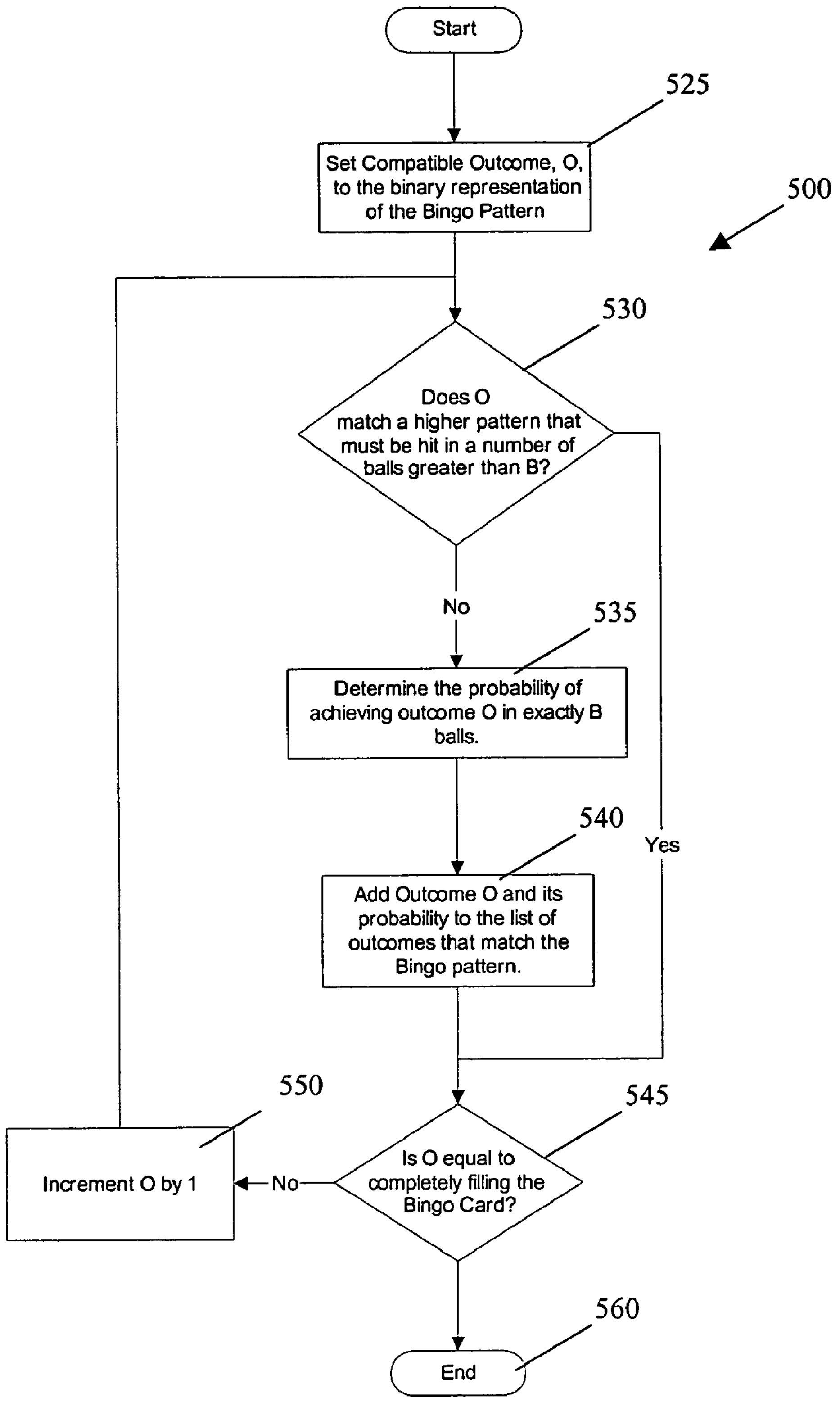
FIG. 5B is a flow chart that outlines one method of the invention.

FIG. 5A illustrates bingo pattern 505 and what will sometimes be referred to herein as "compatible bingo outcomes" or the like. Compatible bingo outcomes 510 are bingo outcomes that include bingo pattern 505, but have zero or more additional spots hit. A binary representation of each outcome is provided in column 515. In this example, binary representation of each outcome is determined by counting a hit as "1" and counting a miss as "0" while scanning the bingo card from left to right and from the top down. It will readily be appreciated that other methods may be used for mapping a bingo outcome to a binary number, e.g., by scanning from the top down and left to right. Column 520 includes the decimal representation of each binary number.

Calculating Probabilities

In preferred implementations of the invention, a payout is made only for the highest-priority bingo pattern that is hit during a game. Accordingly, when calculating a pattern's probability of occurrence, all previously-hit patterns should be taken into account. If P(N) is the probability of pattern N occurring and the lowest-numbered pattern has the lowest associated payout, then the following are true:

The probability of pattern 1=P(1)

The probability of pattern 2=$P(2)-P(1\&2)$

The probability of pattern 3=$P(3)-P(1\&3)-P(1\&2)+P(1\&2\&3)$

It may be observed that the number of terms doubles with each pattern and is equal to $2^N$. It is desirable for global bingo payout sets to include a large number of bingo patterns; some implementations may involve hundreds or even thousands of bingo patterns. Accordingly, preferred implementations of the invention provide more efficient methods for computing the probability of hitting a pattern within a required number of balls drawn, but not hitting any higher-priority patterns. Such implementations of the invention are particularly desirable when a large number of bingo patterns is being used.

According to some such implementations of the invention, each bingo pattern probability is represented as an array of compatible outcomes and associated probabilities. As noted above with reference to FIG. 5A, each compatible outcome is a specific set of hits on the bingo card that hits at least the pattern. Thus, for a 15-spot pattern on a 25-spot bingo card, there will be 2^(25−15)=1024 outcomes that result in hitting the pattern. The pattern probability is calculated for a specific number of balls drawn. The probability of each outcome is the probability of hitting exactly that outcome in exactly that number of balls drawn. If the probability is too low, a higher number of balls drawn may be tried. If the probability is too high, a lower number of balls drawn may be tried. A search (e.g., a binary search) can be used to find quickly the best matching required number of balls drawn, e.g., as described above with reference to FIG. 4. The pattern is then added to a list of previously-calculated patterns and the next pattern is processed.

In this discussion, the following variables will be referenced:

O=Binary representation of a bingo outcome.
B=Number of balls allowed to complete the pattern.
H=The number of hits on the bingo outcome.
T=Total number of balls to draw from, traditionally 75.
S=Bingo card size, traditionally 25.
C (X,Y)=Combinatoric function, equal to X!/(Y!*(X−Y)!)

For the first pattern, the following can be used to calculate the probability of each outcome:

$$P(O, B)=\text{Choose }(T-S, B-H)/\text{Choose }(T, B)$$

For the second through the last pattern, the probability of hitting previous patterns should be accounted for. An overview of one such method follows:

1) Calculate the unmodified outcome probabilities as above.
   a. List all possible outcomes that can match the pattern
   b. Compute the probability of each outcome.
   c. Eliminate any outcomes that have a probability of 0, e.g., due to the outcome requiring more hits than the number of bingo balls drawn.
2) If an outcome also matches a higher priority pattern that hits in a greater number of balls, remove the outcome from the current pattern's list of outcomes.
3) For each higher priority pattern that hits in a lesser number of balls
   a. For each outcome O1 in the higher priority pattern and for each outcome O2 in the current pattern:
      1. Compute the probability of hitting O1 then advancing from O1 to O2 as:
         B1, H1=B & H, for the higher priority pattern
         B2, H2=B & H, for the current pattern
         P(O1)*Choose (T−S−(B1−H1), (B2−B1)−(H2−H1))/Choose (T−B1, B2−B1)
      2. Subtract the computed probability from O2. If the resulting probability for O2 is zero, remove the O2 from the current pattern's list of outcomes.

4) Propagate the probabilities forward to the maximum number of balls drawn for all higher-priority patterns.
   a. Create a new list of probabilities of all outcomes that are compatible with the current pattern, representing the probability of hitting those outcomes in the next higher number of balls drawn (initially B+1). Initialize all probabilities to 0.
   b. Compute the probability of advancing from each outcome in the old list to each outcome in the new list and add that to the probability of the corresponding outcome in the new list.
      i. If the new outcome contains the same number of hits as the old outcome, the probability added is P(O1) *(T−S−(B−H))/(T−B), which represents the probability of drawing a miss.
      ii. If the new outcome contains one more hit than the old outcome, the probability added is P(O1)/(T−B), which represents the probability of drawing the required hit.
      iii. If the new outcome contains two or more hits over the old outcome, the probability added is 0, since it is not possible to achieve more than one hit in a single ball drawn.
   c. The new list now contains the same total probability as the old list, but represents outcomes for one more ball drawn. If any of the outcomes match higher-priority patterns that hit in the new number of balls drawn or greater, remove them from the list.
   d. Replace the new list with the old list and repeat steps a through c until the number of balls drawn is the maximum possible for all higher-priority patterns.
5) Sum the list of probabilities. The sum is the final probability for the current pattern.
6) Step 4 cannot be accurately repeated for successive patterns. Therefore, when a pattern is saved, it is sorted into the list of higher priority patterns according to the number of balls drawn. Then, all of the stored patterns' probabilities are recalculated as if they were prioritized according to the number of balls drawn (highest priority pattern has the fewest number of balls drawn). This recalculation involves repeating only steps 1 and 3 above, since there will be no higher-priority patterns with more balls drawn. This leaves the same probability space occupied for all stored patterns and allows the next pattern's probability to be calculated accurately.

Referring once again to FIG. 5, flow chart 500 outlines a first phase of one such method. This method may be used, for example, to execute steps 425 and 455 of method 400. The first phase of the process involves building a list of compatible outcomes and associated probabilities.

In step 525, a compatible outcome O is set to the binary representation of the bingo pattern being processed. In step 530, it is determined whether O matches a higher-level pattern that must be hit in a number of balls greater than B, the number of balls allowed to complete the pattern. If so, the process continues to step 545. If not, the probability of achieving outcome O in exactly B balls is determined in step 535, as follows:

$$P(O, B)=\text{Choose }(T-S, B-H)/\text{Choose }(T, B)$$

In step 540, outcome O and its corresponding probability are added to the list of bingo outcomes that are compatible with the pattern being processed. In step 545, it is determined whether any additional compatible outcomes may exist; in this implementation, this is determined according to whether O is the "blackout" outcome wherein a card is completely full. If there are more patterns to consider, they are processed in an orderly fashion. In this example, the binary representation of the outcome is incremented by 1, while ensuring that all bits needed to match the bingo pattern are set to 1. (Step 550.) The process continues until it is determined in step 545 that the "blackout" outcome has been considered, at which time the process ends. (Step 560.)

Figure 6:
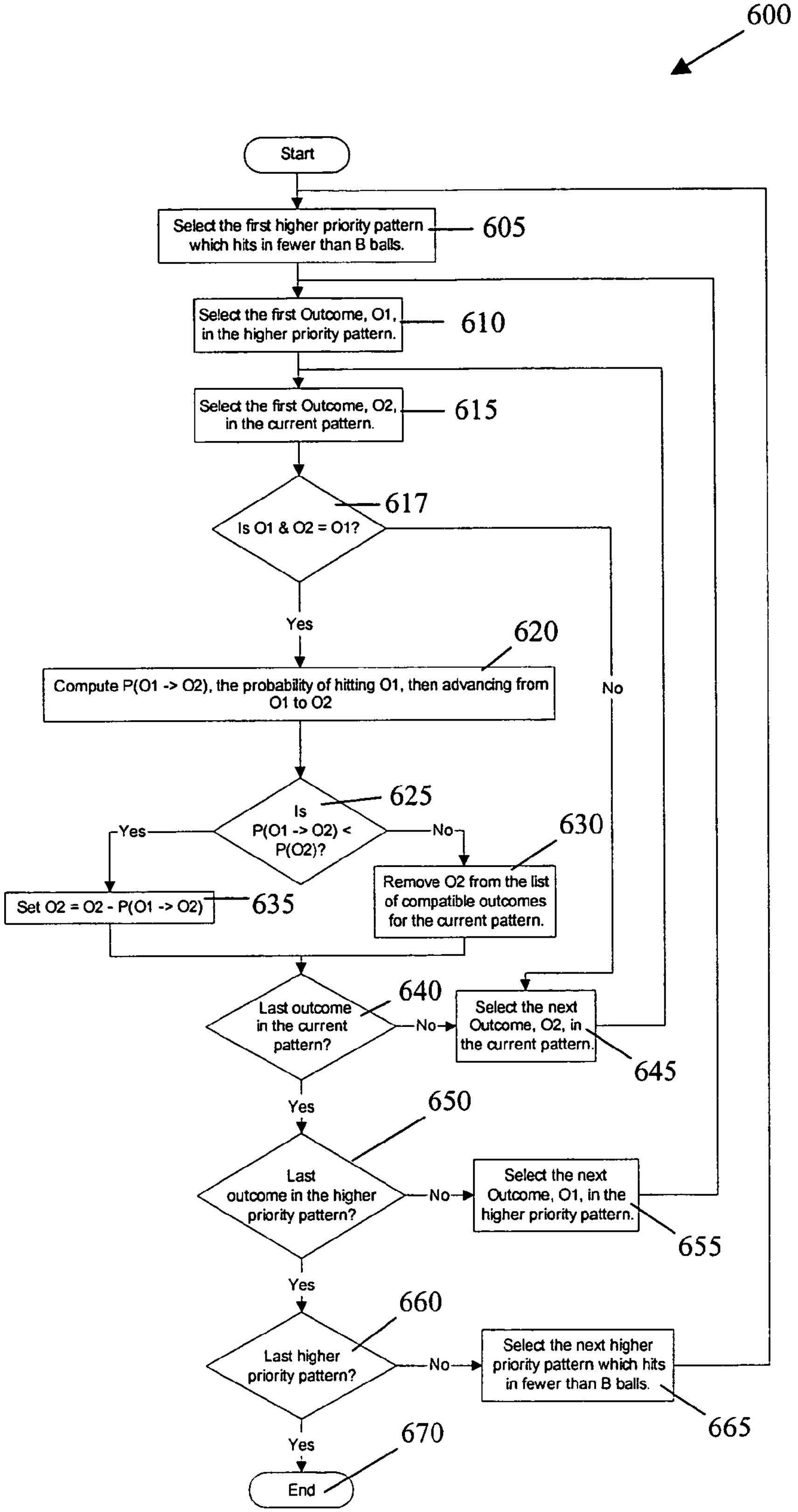
FIG. 6 is a flow chart that outlines one method of the invention.

FIG. 6 depicts flow chart 600, which outlines an exemplary second phase of the method. This phase involves adjusting outcome probabilities to account for higher-priority patterns hit with fewer balls drawn. In step 605, a first higher-priority pattern is selected that hits in fewer than B balls. A first outcome, O1, is then chosen that is compatible with the higher-priority pattern. (Step 610.) A first outcome, O2, is selected that is compatible with the pattern currently being evaluated. (Step 615.)

In step 617, it is determined whether O1 & O2=O1. If so, the probability of hitting O1 and then hitting O2 is calculated, as follows:

$$P(O1 -> O2) = \frac{P(O1) * C(T - S - (B1 - H1), (B2 - B1) - (H2 - B2))}{C(T - B1, B2 - B1)}$$

It is then determined whether the probability of hitting O1 and then hitting O2 is less than the current value of P(O2). (Step 625.) If so, P(O1->O2) is subtracted from the current value of P(O2). (Step 635.) If not, O2 is removed from the list of outcomes that are compatible with the bingo pattern currently being processed.

It is then determined whether the last outcome that is compatible with the current bingo pattern has been processed. (Step 640.) If not, the next outcome that is compatible with the current bingo pattern is selected (step 645) and the process continues until all outcomes compatible with the current bingo pattern are processed.

Then, it is determined whether the last outcome that is compatible with the higher-priority bingo pattern has been processed. (Step 650.) If not, the next outcome that is compatible with the higher-priority bingo pattern is selected (step 655) and the process continues until all outcomes compatible with the higher-priority bingo pattern are processed.

After it is determined in step 650 that all outcomes compatible with the higher-priority bingo pattern have been processed, it is determined whether the last higher-priority pattern has been processed. (Step 660.) If not, the next higher-priority bingo pattern that hits in fewer than B balls is selected (step 665) and the process returns to step 605. After it is determined in step 660 that all higher-priority bingo patterns have been processed, the process ends. (Step 670.)

Figure 7:
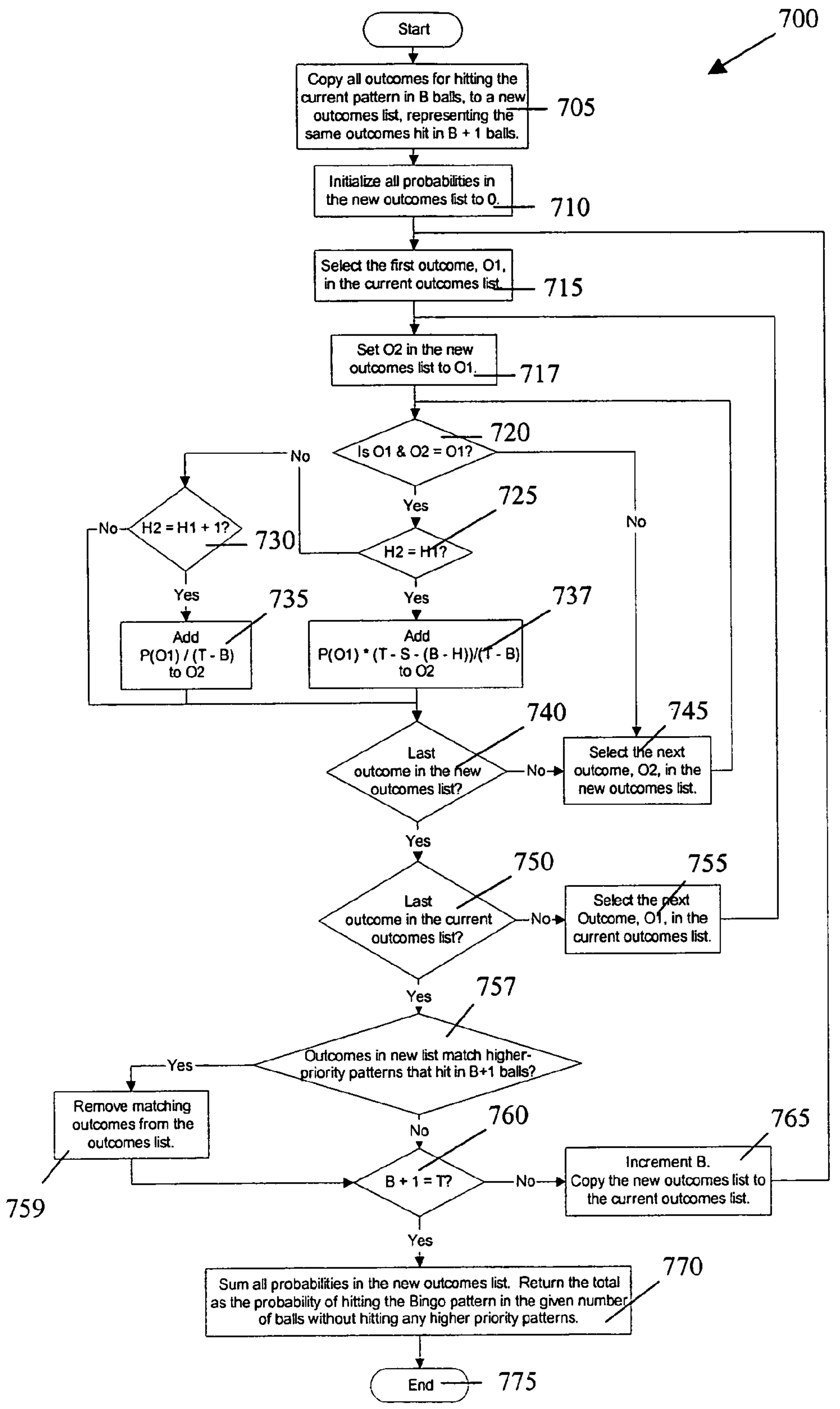
FIG. 7 is a flow chart that outlines one method of the invention.

FIG. 7 depicts flow chart 700, which outlines an exemplary third phase of the method. This phase involves adjusting probabilities to account for higher-priority patterns hit with more balls drawn. In step 705, all outcomes for hitting the current pattern in B balls are copied to a new outcomes list, representing the same outcomes hit in B+1 balls. All probabilities in the new outcomes list are initialized to zero. (Step 710.) The first outcome, O1, is selected (step 715). O2 of the new outcomes list is set to O1. (Step 720.)

In step 720, it is determined whether O1 & O2=O1. This means that every hit in outcome O1 is also a hit in outcome O2. If not, the next outcome O2 is selected in the new outcomes list. (Step 745.) If so, it is then determined whether H2, the number of hits on bingo outcome O2, equals H1, the number of hits on bingo outcome O1. (Step 725.) If H2≠H1, P(O1)/(T−B) is added to the current probability for O2. (Step 735.) If H2=H1, P(O1)*(T−S−(B−H))/(T−B) is added to the current probability for O2. (Step 737.)

In step 740, it is determined whether the last outcome in the new outcomes list has been processed. If not, the next outcome in the new outcomes list is selected (step 745) and processed. In step 750, it is determined whether the last outcome in the current outcomes list has been processed. If not, the next outcome in the current outcomes list is selected (step 755) and processed.

However, if the last outcome in the current outcomes list has been processed, it is determined in step 757 whether there are any outcomes in the new list that match higher-priority patterns that hit in B+1 balls. If so, such outcomes are removed from the new list in step 759.

It is then determined (in step 760) whether B+1=T, the total number of balls that will be dropped in the bingo game. If not, B is incremented. (Step 765.) Note that it is not always necessary to continue until B+1=T. It is only necessary to continue until B+1 equals the maximum number of balls drawn for all higher priority patterns. Accordingly, in some implementations of the invention, it is determined in step 760 whether B+1 equals the maximum number of balls drawn for all higher priority patterns.

The new outcomes list is copied to the current outcomes list, then the process continues to step 715. If it is determined in step 760 that B+1=T, all probabilities in the new outcomes list are summed. (Step 770.) The total is the probability of hitting the bingo pattern in the given number of balls without hitting any higher-priority patterns. The process ends in step 775.

Figure 8:
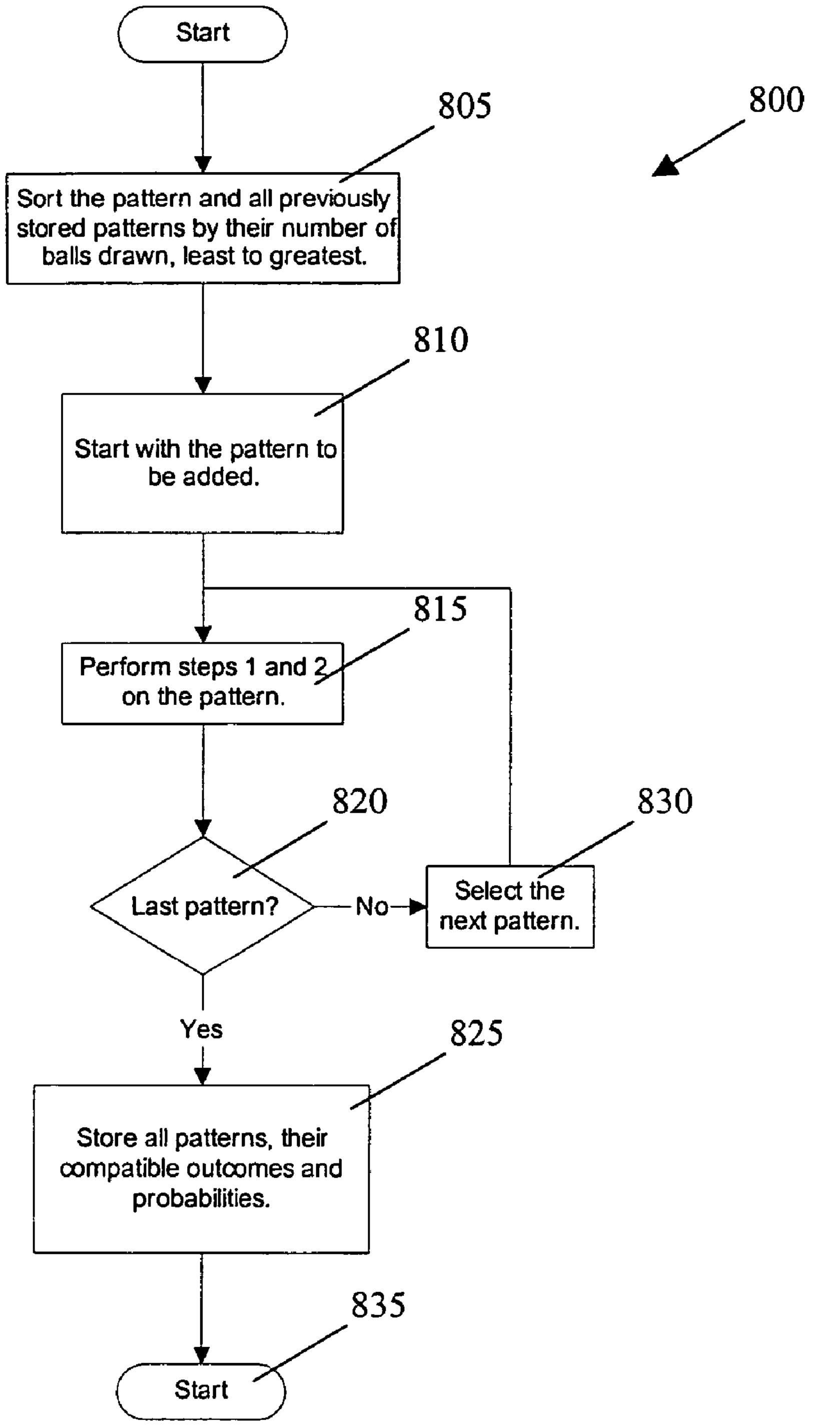
FIG. 8 is a flow chart that outlines one method of the invention.

Method 800, an outline of which is depicted via the flow chart of FIG. 8, provides for storing a pattern and its probability for use in computing the probabilities of lower-priority patterns. In step 805, the pattern is sorted, along with all previously-stored patterns. In this example, the patterns are sorted in ascending order. The pattern to be added is selected first (step 810); all previous patterns have already been sorted and recalculated. In step 815, the steps of methods 500 and 600 are performed on the pattern. Step 815 is performed until it is determined in step 820 that the last pattern has been processed. Then, all bingo patterns, along with their compatible outcomes and probabilities, are stored for use in computing the probability of the next pattern. (Step 825.) The process ends in step 835.

A simple example of the foregoing method is described below. In order to simplify the calculations, the underlying bingo game has 18 balls, numbered 1-18, and a bingo card with six spots on it. A sample bingo card for this game may look like the following:

| | | |
|---|---|---|
| 3 | 11 | 14 |
| 5 | 8 | 16 |

To further simplify our calculations, only 3 bingo patterns will be processed in this example. As in the foregoing discussion, when the bingo patterns are represented in binary, each required hit corresponds to a 1 bit. All other bits are zero:

Pattern A - Pays 50 in 4 balls drawn.

Bingo Pattern

| | | |
|---|---|---|
| X | | |
| X | X | |

Binary Representation

| | | |
|---|---|---|
| 1 | 0 | 0 |
| 1 | 1 | 0 |

Binary 100110 = Decimal 38

Pattern B - Pays 10 in 8 balls drawn.

Bingo Pattern

| | | |
|---|---|---|
| | | X |
| | X | X |

Binary Representation

| | | |
|---|---|---|
| 0 | 0 | 1 |
| 0 | 1 | 1 |

Binary 001011 = Decimal 11

Pattern C - Pays 2 in 6 balls drawn.

Bingo Pattern

| | | |
|---|---|---|
| X | X | X |
| | | |

Binary Representation

| | | |
|---|---|---|
| 1 | 1 | 1 |
| 0 | 0 | 0 |

Binary 111000 = Decimal 56

Computing Probabilities

The patterns are prioritized by their payouts. Pattern A is the highest priority. Pattern B is second. Pattern C is last.

Computing the Probability of Hitting Pattern A in 4 Balls

Step 1. Calculate the outcome probabilities.

Step 1a. List all possible outcomes that can match the pattern.

Bingo pattern A outcomes

| | | |
|---|---|---|
| X | | |
| X | X | |

100110 binary = 38 decimal

| | | |
|---|---|---|
| X | | |
| X | X | X |

100111 binary = 39 decimal

| | | |
|---|---|---|
| X | | X |
| X | X | |

101110 binary = 46 decimal

| | | |
|---|---|---|
| X | | X |
| X | X | X |

101111 binary = 47 decimal

| | | |
|---|---|---|
| X | X | |
| X | X | |

110110 binary = 54 decimal

-continued

Bingo pattern A outcomes

| | | |
|---|---|---|
| X | X | |
| X | X | X |

100111 binary = 55 decimal

| | | |
|---|---|---|
| X | X | X |
| X | X | |

111110 binary = 62 decimal

| | | |
|---|---|---|
| X | X | X |
| X | X | X |

111111 binary = 63 decimal

Step 6. Not necessary, since the patterns are already sorted by number of balls drawn.

Step 1b. Compute the probability of each outcome.

$P(O, B)$=Choose $(T-S, B-H)$/Choose $(T, B)$, where:

O=The binary representation of a bingo outcome

B=The number of balls drawn

T=Total number of balls to draw from.

H=The number of hits on the outcome.

S=bingo card size

This represents:

Probability=Ways to hit the outcome/Ways to draw the given number of bingo balls.

Ways to draw the given number of bingo balls=Choose (Total Balls, Number of balls drawn)=Choose (T, B)

For a given outcome, the set of hits is fixed. Each way to hit the outcome varies only in the balls drawn which are misses. Thus, Ways to hit the outcome=Choose (Total misses possible, number of misses needed)

Probabilities to be subtracted from each outcome in B.

| Pattern B outcomes and probabilities | Pattern A outcomes | | | |
|---|---|---|---|---|
| | 100110 = 38 | 100111 = 39 | 101110 = 46 | 110110 = 54 |
| 001011 = 11<br>0.0180995475 | | | | |
| 001111 = 15<br>0.0113122171 | | | | |
| 011011 = 27<br>0.0113122171 | | | | |
| 011111 = 31<br>0.0050276520 | | | | |
| 101011 = 43<br>0.0113122171 | | | | |
| 101111 = 47<br>0.0050276520 | 0.0002154708 | 0.0000718236 | 0.0000718236 | |
| 111011 = 59<br>0.0050276520 | | | | |
| 111111 = 63<br>0.0015082956 | 9.0000430942 | 0.0000215471 | 0.0000215471 | 0.0000215471 |

Resulting probabilities for pattern B outcomes:

| Bingo pattern B outcomes | Probability of hitting the outcomes in 8 balls |
|---|---|
| 001011 = 11 | 0.0180995475 |
| 001111 = 15 | 0.0113122172 |
| 011011 = 27 | 0.0113122172 |
| 011111 = 31 | 0.0050276521 |
| 101011 = 43 | 0.0113122172 |
| 101111 = 47 | 0.0046685340 |
| 111011 = 59 | 0.0050276521 |
| 111111 = 63 | 0.0014005601 |
| Total | 0.0681605974 |

Each probability now represents the probability of hitting the outcome in pattern B without hitting pattern A.

Step 4. Not necessary, since there are no higher priority patterns that hit in more balls drawn.

Step 5. The sum of all probabilities is 0.0681605974.

Total misses possible=Total Balls−Bingo card size

Number of misses needed=Balls Drawn−Number of hits on the bingo outcome.

Ways to hit the outcome=Choose (T−S, B−H)

| Bingo pattern A outcomes | Probability of hitting the outcomes in 4 balls |
|---|---|
| 100110 = 38 | P (O, B) = Choose (T - S, B - H)/Choose (T, B)<br>P (38, 4) = Choose (18 - 6, 4 - 3)/Choose (18, 4)<br>P (38, 4) = Choose (12, 1)/Choose (18, 4)<br>P (38, 4) = 12/3060<br>P (38, 4) = 0.0039215686 |
| 100111 = 39 | P (O, B) = Choose (T - S, B - H)/Choose (T, B)<br>P (39, 4) = Choose (18 - 6, 4 - 4)/Choose (18, 4)<br>P (39, 4) = Choose (12, 0)/Choose (18, 4)<br>P (39, 4) = 1/3060<br>P (39, 4) = 0.0003267974 |
| 101110 = 46 | P (O, B) = Choose (T - S, B - H)/Choose (T, B)<br>P (46, 4) = Choose (18 - 6, 4 - 4)/Choose (18, 4)<br>P (46, 4) = Choose (12, 0)/Choose (18, 4) |

-continued

| Bingo pattern A outcomes | Probability of hitting the outcomes in 4 balls |
|---|---|
| | P (46, 4) = 1/3060 |
| | P (46, 4) = 0.0003267974 |
| 101111 = 47 | Impossible to hit 5 spots in 4 balls drawn. |
| | P (47, 4) = 0 |
| 110110 = 54 | P (O, B) = Choose (T - S, B - H)/Choose (T, B) |
| | P (54, 4) = Choose (18 - 6, 4 - 4)/Choose (18, 4) |
| | P (54, 4) = Choose (12, 0)/Choose (18, 4) |
| | P (54, 4) = 1/3060 |
| | P (54, 4) = 0.0003267974 |
| 110111 = 55 | Impossible to hit 5 spots in 4 balls drawn. |
| | P (55, 4) = 0 |
| 111110 = 62 | Impossible to hit 5 spots in 4 balls drawn. |
| | P (62, 4) = 0 |
| 111111 = 63 | Impossible to hit 6 spots in 4 balls drawn. |
| | P (63, 4) = 0 |

Step 1c. Eliminate any outcomes which have a probability of 0, most likely due the pattern requiring to more hits than the number of bingo balls drawn.

| Bingo pattern A outcomes | Probability of hitting the outcomes in 4 balls |
|---|---|
| 100110 = 38 | 0.0039215686 |
| 100111 = 39 | 0.0003267974 |
| 101110 = 46 | 0.0003267974 |
| 110110 = 54 | 0.0003267974 |

Steps 2-4 are unnecessary, since this is the first pattern.

Step 5. Sum the list of probabilities. The sum is the final probability for the current pattern.

| Bingo pattern A outcomes | Probability of hitting the outcomes in 4 balls |
|---|---|
| 100110 = 38 | 0.0039215686 |
| 100111 = 39 | 0.0003267974 |
| 101110 = 46 | 0.0003267974 |
| 110110 = 54 | 0.0003267974 |
| Total | 0.0049019608 |

Step 6. Not necessary, since this is the first pattern.

Thus, the probability of hitting pattern A is 0.0049019608. If this probability is acceptable, it is stored as the final probability for pattern A. Pattern A's list of outcomes and probabilities is stored for processing lower priority patterns.

Computing the Probability of Hitting Pattern B in 8 Balls, and not Hitting Pattern A in 4 Balls.

Step 1. Calculate the unmodified outcome probabilities using P (R, C) above.

Step 1a. List all possible outcomes that can match the pattern.

Bingo pattern B outcomes

| | | |
|---|---|---|
| | | X |
| | X | X |

001011 binary = 11 decimal

-continued

Bingo pattern B outcomes

| | | |
|---|---|---|
| | | X |
| X | X | X |

001111 binary = 15 decimal

| | | |
|---|---|---|
| | X | X |
| | X | X |

011011 binary = 27 decimal

| | | |
|---|---|---|
| | X | X |
| X | X | X |

011111 binary = 31 decimal

| | | |
|---|---|---|
| X | | X |
| | X | X |

101011 binary = 43 decimal

| | | |
|---|---|---|
| X | | X |
| X | X | X |

101111 binary = 47 decimal

| | | |
|---|---|---|
| X | X | X |
| | X | X |

111011 binary = 59 decimal

| | | |
|---|---|---|
| X | X | X |
| X | X | X |

111111 binary = 63 decimal

Step 1b. Compute the probability of each outcome.

| Bingo pattern B outcomes | Probability of hitting the outcomes in 8 balls |
|---|---|
| 001011 = 11 | P (O, B) = Choose (T - S, B - H)/Choose (T, B) |
| | P (11, 8) = Choose (18 - 6, 8 - 3)/Choose (18, 8) |
| | P (11, 8) = 0.0180995475 |
| 001111 = 15 | P (O, B) = Choose (T - S, B - H)/Choose(T, B) |
| | P (15, 8) = Choose (18 - 6, 8 - 4)/Choose (18, 8) |
| | P (15, 8) = 0.0113122172 |
| 011011 = 27 | P (O, B) = Choose (T - S, B - H)/Choose(T, B) |
| | P (27, 8) = Choose (18 - 6, 8 - 4)/Choose (18, 8) |
| | P (27, 8) = 0.0113122172 |
| 011111 = 31 | P (O, B) = Choose (T - S, B - H)/Choose(T, B) |
| | P (31, 8) = Choose (18 - 6, 8 - 5)/Choose (18, 8) |
| | P (31, 8) = 0.0050276521 |
| 101011 = 43 | P (O, B) = Choose (T - S, B - H)/Choose (T, B) |
| | P (43, 8) = Choose (18 - 6, 8 - 4)/Choose (18, 8) |
| | P (43, 8) = 0.0113122172 |
| 101111 = 47 | P (O, B) = Choose (T - S, B - H)/Choose (T, B) |
| | P (47, 8) = Choose (18 - 6, 8 - 5)/Choose (18, 8) |
| | P (47, 8) = 0.0050276521 |
| 111011 = 59 | P (O, B) = Choose (T - S, B - H)/Choose (T, B) |

-continued

| Bingo pattern B outcomes | Probability of hitting the outcomes in 8 balls |
|---|---|
| | P (59, 8) = Choose (18 - 6, 8 - 5)/Choose (18, 8) |
| | P (59, 8) = 0.0050276521 |
| 111111 = 63 | P (O, B) = Choose (T - S, B - H)/Choose (T, B) |
| | P (63, 8) = Choose (18 - 6, 8 - 6)/Choose (18, 8) |
| | P (63, 8) = 0.0015082956 |

Step 1c. Eliminate any outcomes which have a probability of 0, most likely due the pattern requiring to more hits than the number of bingo balls drawn.

No outcomes are eliminated.

| Bingo pattern B outcomes | Probability of hitting the outcomes in 8 balls |
|---|---|
| 001011 = 11 | 0.0180995475 |
| 001111 = 15 | 0.0113122172 |
| 011011 = 27 | 0.0113122172 |
| 011111 = 31 | 0.0050276521 |
| 101011 = 43 | 0.0113122172 |
| 101111 = 47 | 0.0050276521 |
| 111011 = 59 | 0.0050276521 |
| 111111 = 63 | 0.0015082956 |

Step 2. If the outcome also matches a higher priority pattern that hits in a greater number of balls, remove the outcome from the current pattern's list of outcomes.

There is no higher priority pattern that hits in a greater number of balls. Skip step 2.

Step 3. For each higher priority pattern that hits in a lesser number of balls, subtract the probability of hitting any outcome in the higher priority pattern, then proceeding to hit an outcome in the current pattern being evaluated.

Select pattern A (it is the first and only higher priority pattern that hits in fewer balls).

Compare each outcome in pattern A to each outcome in pattern B. Compute the probability of going from the pattern A outcome to the pattern B outcome.

Each possibility is worked out using this equation:

$$P(O1, O2) = \text{Choose}(T-S-(B1-H1), (B2-B1)-(H2-H1))/\text{Choose}(T-B1, B2-B1),$$

where

O1=The higher priority outcome.

O2=The current lower priority outcome being evaluated.

B1=The number of balls drawn to hit O1.

B2=The number of balls drawn to hit O2. B2>B1.

H1=The number of hits on O1.

H2=The number of hits on O2. H2>=H1.

T=Total number of balls to draw from.

S=bingo card size.

In the equation above,

T−S−(B1−H1) is the number of misses available to draw from. That is, after O1 has been hit, it is the number of balls left to be drawn which are misses.

(B2−B1)−(H2−H1) is the number of misses required to go from O1 to O2.

T−B1 is the number of balls to draw from after O1 is hit.

B2−B1 is the number of balls to draw to hit O2.

As before, the number of hits required is fixed. Each way to go from O1 to O2 varies only in the balls drawn which are misses.

Choose (T−S−(B1−H1), (B2−B1)−(H2−H1)) is the number of ways to draw the required number of misses.

Choose (T−B1, B2−B1) is the number of ways to draw the required number of balls.

In order for it to be possible to go from the pattern A outcome to the pattern B outcome, each hit in the pattern A outcome must also be a hit in the pattern B outcome. Where the chart is blank, it is not possible to go from the pattern A outcome to the pattern B outcome and the probability is 0.

Probabilities for proceeding from each outcome in A to each outcome in B.

| Pattern B outcomes and probabilities | Pattern A outcomes and probabilities: 100110 = 38 0.0039215686 | 100111 = 39 0.0003267973 | 101110 = 46 0.0003267973 | 110110 = 54 0.0003267973 |
|---|---|---|---|---|
| 001011 = 11 0.0180995475 | | | | |
| 001111 = 15 0.0113122171 | | | | |
| 011011 = 27 0.0113122171 | | | | |
| 011111 = 31 0.0050276520 | | | | |
| 101011 = 43 0.0113122171 | | | | |
| 101111 = 47 0.0050276520 | 0.0549450549 | 0.2197802198 | 0.2197802198 | |
| 111011 = 59 0.0050276520 | | | | |
| 111111 = 63 0.0015082956 | 0.0109890110 | 0.2197802198 | 0.2197802198 | 0.2197802198 |

For example, to go from pattern A outcome 38 to pattern B outcome 47:

T=18 balls to draw from

S=6 spots on the bingo card

B1=4 balls drawn to hit pattern A outcome 38

H1=3 hits on pattern A outcome 38

B2=8 balls drawn to hit pattern B outcome 47

H2=4 hits on pattern B outcome 47

P=Choose (T−S−(B1−H1), (B2−B1)−(H2−H1))/Choose (T−B1, B2−B1)

P=Choose (18−6−(4−3), (8−4)−(5−3))/Choose (18−4, 8−4)

P=Choose (11, 2)/Choose (14, 4)

P=55/1001

P=0.0549450549

Thus, once pattern A outcome 38 is hit, the probability of proceeding to pattern B outcome 47 is 0.0549450549. The probability of hitting pattern A outcome 38 (0.0039215686) *the probability of proceeding to pattern B outcome 47 (0.0549450549) must be subtracted from the probability of hitting pattern B outcome 47:

Each entry in this chart is the probability of hitting the outcome in pattern A, then proceeding to hit the outcome in pattern B. This probability must be subtracted from the outcome in pattern B.

Thus, the probability of hitting pattern B and not hitting pattern A is 0.0681605974. If this probability is acceptable, it is stored as the final probability for pattern B. Pattern B's list of outcomes and probabilities is stored for processing lower priority patterns.

Computing the Probability of Hitting Pattern C in 6 Balls, and not Hitting Pattern A in 4 Balls or Pattern B in 8 Balls.

Step 1. Calculate the unmodified outcome probabilities using P (R, C) above.

Step 1a. List all possible outcomes that can match the pattern.

Bingo pattern C outcomes

| | | |
|---|---|---|
| X | X | X |
| | | |

111000 binary = 56 decimal

| | | |
|---|---|---|
| X | X | X |
| | | X |

111001 binary = 57 decimal

| | | |
|---|---|---|
| X | X | X |
| | X | |

111010 binary = 58 decimal

| | | |
|---|---|---|
| X | X | X |
| | X | X |

111011 binary = 59 decimal

| | | |
|---|---|---|
| X | X | X |
| X | | |

111100 binary = 60 decimal

| | | |
|---|---|---|
| X | X | X |
| X | | X |

111101 binary = 61 decimal

| | | |
|---|---|---|
| X | X | X |
| X | X | |

111110 binary = 62 decimal

| | | |
|---|---|---|
| X | X | X |
| X | X | X |

111111 binary = 63 decimal

Step 1b. Compute the probability of each outcome.

| Bingo pattern C outcomes | Probability of hitting the outcomes in 6 balls |
|---|---|
| 111000 = 56 | P (O, B) = Choose (T - S, B - H)/Choose (T, B)<br>P (56, 6) = Choose (18 - 6, 6 - 3)/Choose (18, 6)<br>P (56, 6) = 0.0118508942 |
| 111001 = 57 | P (O, B) = Choose (T - S, B - H)/Choose (T, B)<br>P (56, 6) = Choose (18 - 6, 6 - 4)/Choose (18, 6)<br>P (56, 6) = 0.0035552683 |
| 111010 = 58 | P (O, B) = Choose (T - S, B - H)/Choose (T, B)<br>P (56, 6) = Choose (18 - 6, 6 - 4)/Choose (18, 6)<br>P (56, 6) = 0.0035552683 |
| 111011 = 59 | P (O, B) = Choose (T - S, B - H)/Choose (T, B)<br>P (56, 6) = Choose (18 - 6, 6 - 5)/Choose (18, 6)<br>P (56, 6) = 0.0006464124 |
| 111100 = 60 | P (O, B) = Choose (T - S, B - H)/Choose (T, B)<br>P (56, 6) = Choose (18 - 6, 6 - 4)/Choose (18, 6)<br>P (56, 6) = 0.0035552683 |
| 111101 = 61 | P (O, B) = Choose (T - S, B - H)/Choose (T, B)<br>P (56, 6) = Choose (18 - 6, 6 - 5)/Choose (18, 6)<br>P (56, 6) = 0.0006464124 |
| 111110 = 62 | P (O, B) = Choose (T - S, B - H)/Choose (T, B)<br>P (56, 6) = Choose (18 - 6, 6 - 5)/Choose (18, 6)<br>P (56, 6) = 0.0006464124 |
| 111111 = 63 | P (O, B) = Choose (T - S, B - H)/Choose (T, B)<br>P (56, 6) = Choose (18 - 6, 6 - 6)/Choose (18, 6)<br>P (56, 6) = 0.0000538677 |

Step 1c. Eliminate any outcomes which have a probability of 0, most likely due the pattern requiring to more hits than the number of bingo balls drawn.

No outcomes are eliminated.

| Bingo pattern C outcomes | Probability of hitting the outcomes in 6 balls |
|---|---|
| 111000 = 56 | 0.0118508942 |
| 111001 = 57 | 0.0035552683 |
| 111010 = 58 | 0.0035552683 |
| 111011 = 59 | 0.0006464124 |
| 111100 = 60 | 0.0035552683 |
| 111101 = 61 | 0.0006464124 |
| 111110 = 62 | 0.0006464124 |
| 111111 = 63 | 0.0000538677 |

Step 2. If an outcome also matches a higher priority pattern that hits in a greater number of balls, remove the outcome from the current pattern's list of outcomes.

Outcomes 59 and 63 match pattern B. If one of those outcomes occurs in 6 balls, it matches the higher priority pattern B and not the lower priority pattern C. Remove the outcomes from pattern C:

| Bingo pattern C outcomes | Probability of hitting the outcomes in 6 balls |
|---|---|
| 111000 = 56 | 0.0118508942 |
| 111001 = 57 | 0.0035552683 |
| 111010 = 58 | 0.0035552683 |
| 111100 = 60 | 0.0035552683 |
| 111101 = 61 | 0.0006464124 |
| 111110 = 62 | 0.0006464124 |

Step 3. For each higher priority pattern that hits in a lesser number of balls, subtract the probability of hitting any outcome in the higher priority pattern, then proceeding to hit an outcome in the current pattern being evaluated.

Select pattern A (it is the first and only higher priority pattern that hits in fewer balls). Compare each outcome in pattern A to each outcome in pattern C. Compute the probability of going from the pattern A outcome to the pattern C outcome.

Probabilities for proceeding from each outcome in A to each outcome in C.

| Pattern C outcomes and probabilities | Pattern A outcomes and probabilities 100110 = 38 0.0039215686 | 100111 = 39 0.0003267973 | 101110 = 46 0.0003267973 | 110110 = 54 0.0003267973 |
|---|---|---|---|---|
| 111000 = 56 0.0118508942 | | | | |
| 111001 = 57 0.0035552683 | | | | |
| 111010 = 58 0.0035552683 | | | | |
| 111100 = 60 0.0035552683 | | | | |
| 111101 = 61 0.0006464124 | | | | |
| 111110 = 62 0.0006464124 | 0.0109890110 | | 0.1318681319 | 0.1318681319 |

Each entry in the following chart is the probability of hitting the outcome in pattern A, then proceeding to hit the outcome in pattern B. This probability must be subtracted from the outcome in pattern B.

Probabilities to be subtracted from each outcome in C.

| Pattern C outcomes and probabilities | Pattern A outcomes 100110 = 38 0.0039215686 | 100111 = 39 0.0003267973 | 101110 = 46 0.0003267973 | 110110 = 54 0.0003267973 |
|---|---|---|---|---|
| 111000 = 56 0.0118508942 | | | | |
| 111001 = 57 0.0035552683 | | | | |
| 111010 = 58 0.0035552683 | | | | |
| 111100 = 60 0.0035552683 | | | | |
| 111101 = 61 0.0006464124 | | | | |
| 111110 = 62 0.0006464124 | 0.0000430942 | | 0.0000430942 | 0.0000430942 |

Resulting probabilities for pattern C outcomes:

| Bingo pattern C outcomes | Probability of hitting the outcomes in 6 balls |
|---|---|
| 111000 = 56 | 0.0118508942 |
| 111001 = 57 | 0.0035552683 |
| 111010 = 58 | 0.0035552683 |
| 111100 = 60 | 0.0035552683 |
| 111101 = 61 | 0.0006464124 |
| 111110 = 62 | 0.0005171298 |
| Total | 0.0236802413 |

A copy of these outcomes and probabilities will be preserved for step 6.

Step 4. Propagate the probabilities forward to the maximum number of balls drawn for all higher priority patterns.

If the outcome in 7 balls has the same hits as the outcome in 6 balls, the probability of advancement is (T−S−(B−H))/(T−B). (T−S−(B−H)) is the number of misses left to be drawn. (T−B) is the number of balls left to draw from.

If the outcome in 7 balls has the same hits as the outcome in 6 balls, plus one more hit, the probability of advancement is 1/(T−B)— that is the probability of drawing the one required hit in the next ball drawn.

For all other cases, it is not possible to advance from the outcome in 6 balls to the outcome in 7 balls. The probability is 0

Probability of advancing from one outcome in 6 balls to one outcome in 7 balls

| Pattern C Outcomes In 6 balls | In 7 balls 111000 = 56 | 111001 = 57 | 111010 = 58 | 111011 = 59 | 111100 = 60 | 111101 = 61 | 111110 = 62 | 111111 = 63 |
|---|---|---|---|---|---|---|---|---|
| 111000 = 56<br>0.0118508942 | .7500000000 | 0.0833333333 | 0.0833333333 | | 0.0833333333 | | | |
| 111001 = 57<br>0.0035552683 | | 0.8333333333 | | 0.0833333333 | | 0.0833333333 | | |
| 111010 = 58<br>0.0035552683 | | | 0.8333333333 | 0.0833333333 | | | 0.0833333333 | |
| 111100 = 60<br>0.0035552683 | | | | | 0.8333333333 | 0.0833333333 | 0.0833333333 | |
| 111101 = 61<br>0.0006464124 | | | | | | 0.9166666666 | | 0.0833333333 |
| 111110 = 62<br>0.0005171298 | | | | | | | 0.9166666666 | 0.0833333333 |

A sample calculation:

To advance from outcome 56 in 6 balls to outcome 56 in 7 balls, the probability is:

$$(T-S-(B-H))/(T-B)=(18-6-(6-3))/(18-6)=9/12=0.75$$

To advance from outcome 56 in 6 balls to outcome 57 in 7 balls, the probability is:

$$1/(T-B)=1/(18-6)=1/12.$$

It is not possible to advance from outcome 56 to outcome 63 in one ball drawn, since outcome 63 has 3 more hits than outcome 56.

It is not possible to advance from outcome 58 to outcome 56, since outcome 56 has fewer hits than 58.

It is not possible to advance from outcome 58 to outcome 56, they have different hits.

The probability of hitting the 6 ball outcome is multiplied by the probability of advancing to the 7 ball outcome:

Probability of advancing from one outcome in 6 balls to one outcome in 7 balls

| Pattern C Outcomes In 6 balls | In 7 balls 111000 = 56 | 111001 = 57 | 111010 = 58 | 111011 = 59 | 111100 = 60 | 111101 = 61 | 111110 = 62 | 111111 = 63 |
|---|---|---|---|---|---|---|---|---|
| 111000 = 56 | 0.00888817065 | 0.0009875745 | 0.0009875745 | | 0.0009875745 | | | |
| 111001 = 57 | | 0.0029627236 | | 0.0002962724 | | 0.0002962724 | | |
| 111010 = 58 | | | 0.0029627238 | 0.0002962724 | | | 0.0002962724 | |
| 111100 = 60 | | | | | 0.0029627238 | 0.0002962724 | 0.0002962724 | |
| 111101 = 61 | | | | | | 0.0005925447 | | 0.0000538677 |
| 111110 = 62 | | | | | | | 0.0004740356 | 0.0000430946 |

The probabilities are summed for each 7 ball outcome:

| In 7 balls 111000 = 56 | 111001 = 57 | 111010 = 58 | 111011 = 59 | 111100 = 60 | 111101 = 61 | 111110 = 62 | 111111 = 63 |
|---|---|---|---|---|---|---|---|
| 0.0088881706 | 0.0039502981 | 0.0039502983 | 0.0005925448 | 0.0039502983 | 0.0011850895 | 0.0010665804 | 0.0000969623 |

This yields:

| Bingo pattern C outcomes | Probability of hitting the outcomes in 6 balls, propagated forward to 7 balls: |
|---|---|
| 111000 = 56 | 0.0088881706 |
| 111001 = 57 | 0.0039502981 |
| 111010 = 58 | 0.0039502983 |
| 111011 = 59 | 0.0005925448 |
| 111100 = 60 | 0.0039502983 |
| 111101 = 61 | 0.0011850895 |

-continued

| Bingo pattern C outcomes | Probability of hitting the outcomes in 6 balls, propagated forward to 7 balls: |
|---|---|
| 111110 = 62 | 0.0010665804 |
| 111111 = 63 | 0.0000969623 |

To verify the results, one can check to see that the total probability of all outcomes in 6 balls drawn and is the same as the total probability of all outcomes in 7 balls drawn.

The process is repeated for advancing from 7 balls drawn to 8 balls drawn.

Compute the probability of advancing from each outcome in 7 balls drawn to each outcome in 8 balls drawn:

| Probability of advancing from one outcome in 7 balls drawn to one outcome in 8 balls drawn | | | | | | | | |
|---|---|---|---|---|---|---|---|---|
| Pattern C Outcomes | In 8 balls | | | | | | | |
| In 7 balls | 111000 = 56 | 111001 = 57 | 111010 = 58 | 111011 = 59 | 111100 = 60 | 111101 = 61 | 111110 = 62 | 111111 = 63 |
| 111000 = 56<br>0.0088881706 | 0.7272727272 | 0.0909090909 | 0.0909090909 | | 0.0909090909 | | | |
| 111001 = 57<br>0.0039502981 | | 0.8181818181 | | 0.0909090909 | | 0.0909090909 | | |
| 111010 = 58<br>0.0039502983 | | | 0.8181818181 | 0.0909090909 | | | 0.0909090909 | |
| 111011 = 59<br>0.0005925448 | | | | 0.9090909090 | | | | 0.0909090909 |
| 111100 = 60<br>0.0039502983 | | | | | 0.8181818181 | 0.0909090909 | 0.0909090909 | |
| 111101 = 61<br>0.0011850895 | | | | | | 0.9090909090 | | 0.0909090909 |
| 111110 = 62<br>0.0010665804 | | | | | | | 0.9090909090 | 0.0909090909 |
| 111111 = 63<br>0.0000969623 | | | | | | | | 1 |

Multiply each probability of advancing by the probability of hitting the outcome in 7 balls:

| Probability of advancing from one outcome in 7 balls drawn to one outcome in 8 balls drawn | | | | | | | | |
|---|---|---|---|---|---|---|---|---|
| Pattern C Outcomes | In 8 balls | | | | | | | |
| In 7 balls | 111000 = 56 | 111001 = 57 | 111010 = 58 | 111011 = 59 | 111100 = 60 | 111101 = 61 | 111110 = 62 | 111111 = 63 |
| 111000 = 56 | 0.0064641241 | 0.0008080155 | 0.0008080155 | | 0.0008080155 | | | |
| 111001 = 57 | | 0.0032320621 | | 0.0003591180 | | 0.0003591180 | | |
| 111010 = 58 | | | 0.0032320622 | 0.0003591180 | | | 0.0003591180 | |
| 111011 = 59 | | | | 0.0005386771 | | | | 0.0000538677 |
| 111100 = 60 | | | | | 0.0032320622 | 0.0003591180 | 0.0003591180 | |
| 111101 = 61 | | | | | | 0.0010773541 | | 0.0001077354 |
| 111110 = 62 | | | | | | | 0.0009696185 | 0.0000969618 |
| 111111 = 63 | | | | | | | | 0.0000969623 |

Sum the probabilities of hitting each outcome in 8 balls drawn:

| In 7 balls drawn | | | | | | | |
|---|---|---|---|---|---|---|---|
| 111000 = 56 | 111001 = 57 | 111010 = 58 | 111011 = 59 | 111100 = 60 | 111101 = 61 | 111110 = 62 | 111111 = 63 |
| 0.0064641241 | 0.0040400776 | 0.0040400777 | 0.0012569131 | 0.0040400777 | 0.0017955901 | 0.0016878545 | 0.0003555272 |

This yields:

| Bingo pattern C outcomes | Probability of hitting the outcomes in 6 balls, propagated forward to 8 balls: |
|---|---|
| 111000 = 56 | 0.0064641241 |
| 111001 = 57 | 0.0040400776 |
| 111010 = 58 | 0.0040400777 |
| 111011 = 59 | 0.0012569131 |
| 111100 = 60 | 0.0040400777 |
| 111101 = 61 | 0.0017955901 |
| 111110 = 62 | 0.0016878545 |
| 111111 = 63 | 0.0003555272 |

Again, to verify the results, one can check to see that the total probability of all outcomes in 7 balls drawn and is the same as the total probability of all outcomes in 8 balls drawn.

At 8 balls drawn, we are ready to compare pattern C to pattern B, which is a higher priority pattern that hits in 8 balls. One can see that outcomes 59 and 63, which match pattern C, also match pattern B. These outcomes are removed from pattern C's outcomes, since they represent the probability of hitting pattern C in 6 balls drawn and then proceeding to hit pattern B in 8 balls drawn.

Step 5. Sum the probabilities.

| Bingo pattern C outcomes | Probability of hitting the outcomes in 6 balls, propagated forward to 8 balls: |
|---|---|
| 111000 = 56 | 0.0064641241 |
| 111001 = 57 | 0.0040400776 |
| 111010 = 58 | 0.0040400777 |
| 111100 = 60 | 0.0040400777 |
| 111101 = 61 | 0.0017955901 |
| 111110 = 62 | 0.0016878545 |
| Total | 0.022067802 |

Thus, we have:

| Reported Pattern Probabilities | | | | |
|---|---|---|---|---|
| Priority | Pattern | Balls Drawn to Hit | Probability | Pays |
| 1 | A | 4 | 0.0049019608 | 50 |
| 2 | B | 8 | 0.0681605974 | 10 |
| 3 | C | 6 | 0.0220678020 | 2 |

Step 6. Reprioritize the patterns by number of balls drawn, so the highest priority pattern must be hit in the lowest number of balls and the lowest priority pattern must be hit in the highest number of balls.

What is required is:

| Priority | Pattern | Balls Drawn to Hit |
|---|---|---|
| 1 | A | 4 |
| 2 | C | 6 |
| 3 | B | 8 |

Pattern A is already in position. Its outcomes already have the proper probabilities. Pattern C's outcomes will have the proper probabilities, if the results from the end of step 3 are used. This yields:

| Priority | Pattern | Balls Drawn to Hit | Probability | Pays |
|---|---|---|---|---|
| 1 | A | 4 | 0.0049019608 | 50 |
| 2 | C | 6 | 0.0236802413 | 2 |

Pattern B must be reprocessed, through steps 1-3, to calculate its probability of hitting without hitting patterns A or C. The result is:

| Stored Pattern Probabilities | | | | |
|---|---|---|---|---|
| Priority | Pattern | Balls Drawn to Hit | Probability | Pays |
| 1 | A | 4 | 0.0049019608 | 50 |
| 2 | C | 6 | 0.0236802413 | 2 |
| 3 | B | 8 | 0.0665481581 | 10 |

This technique works in the general case. All patterns with a higher priority than the current pattern being evaluated are already properly sorted. The current pattern is properly sorted if the results from the end of step 3 are used. The remaining patterns must be reprocessed, in order, through steps 1-3.

This step is necessary for adding further patterns—the formulas only produce correct results for the current pattern if the previous patterns are prioritized by number of balls drawn. Note that the Reported Pattern Probabilities are accurate for the bingo game as it is played. The Stored Pattern Probabilities are accurate for calculating the probabilities for further patterns. Note that the sum of the Reported Pattern Probabilities is the same as the sum of the Stored Pattern Probabilities. In the Reported Pattern Probabilities, the probability of hitting both Patterns B and C is added to pattern B's probability. In the Stored Pattern Probabilities, due to the reprioritized Patterns, the probability of hitting both Patterns B and C is added to Pattern C's probability.

Updating/Adding Games

As new games are added, there may be a need to add new pay amounts. The game may be released with the existing set of patterns and pay amounts, so that it will not be possible to hit the new pay amounts because there are no bingo patterns associated with those pay amounts. The game is still playable, but not at the full range of possible outcomes that a Class III game would offer.

Figure 9:
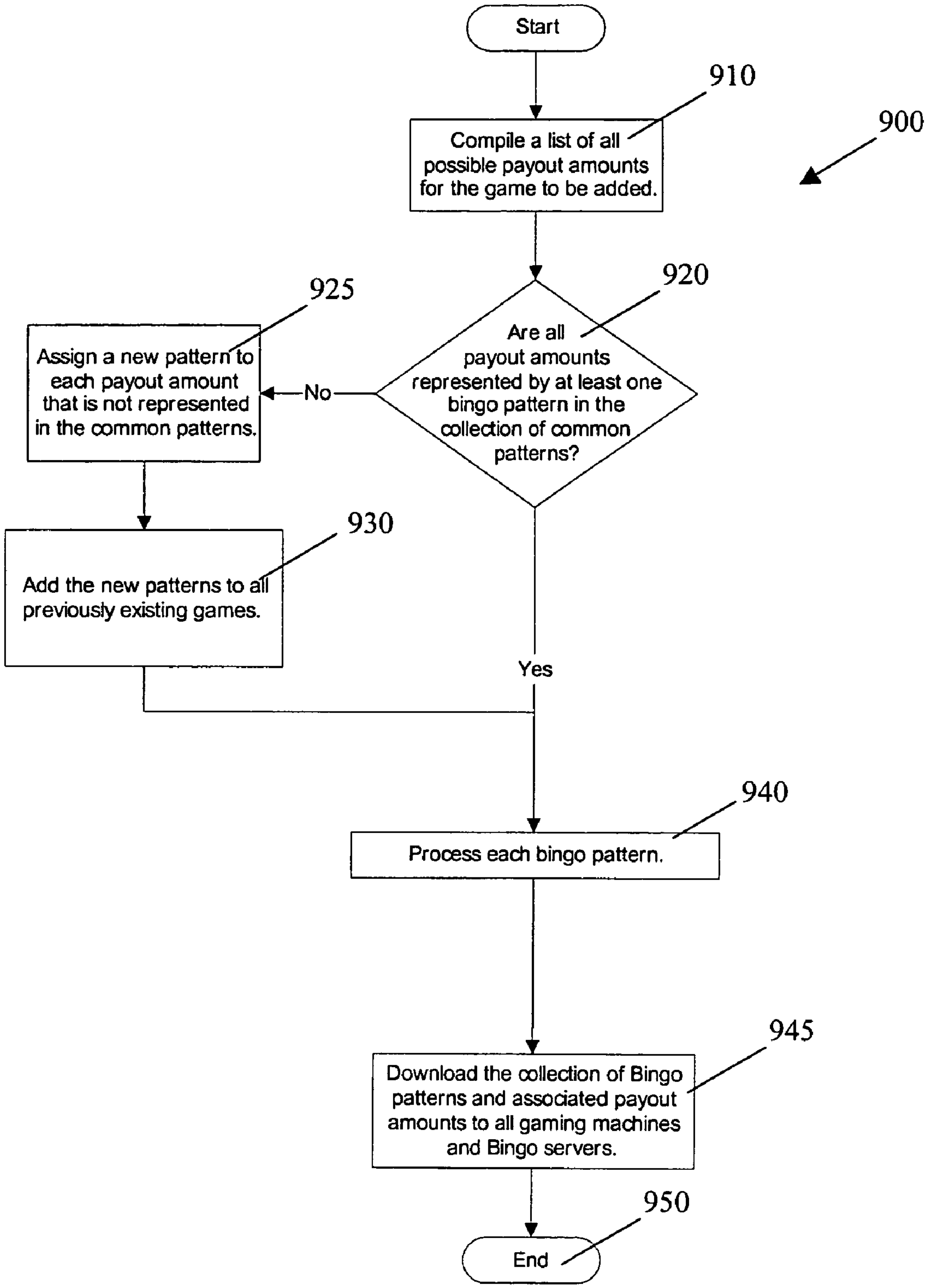
FIG. 9 is a flow chart that outlines one method of the invention.

FIG. 9 depicts an outline of method 900 for adding a new game to a collection of pre-existing games with common bingo patterns (i.e., to a previously-formed global bingo payout set). In step 910, a list is compiled of all possible payout amounts for the game to be added. In step 920, it is determined whether all payout amounts for the game to be added are represented by a bingo pattern in the previously-formed global bingo payout set.

If so, each bingo pattern is processed in step 940. For each bingo pattern, the number of balls drawn within which the bingo pattern must be completed is set so that the probability of completing the pattern matches the games' probability of paying the associated payout amount.

If one or more new bingo patterns are required, they are assigned to each corresponding payout amount in step 925. The new patterns are made available to all previously-existing games. (Step 930.) However, in some implementations, the patterns' probability of occurrence is set to a very low value, e.g., the minimum possible value. The bingo patterns are processed in step 240. A theme-specific data set is created for the new game, so that payout amounts can be mapped to outcomes for the new game. The revised global bingo payout and theme-specific data set are then available to be added and downloaded to networked servers, gaming machines, associated storage devices, etc., so that all games can have the same patterns and payouts.

Figure 10:
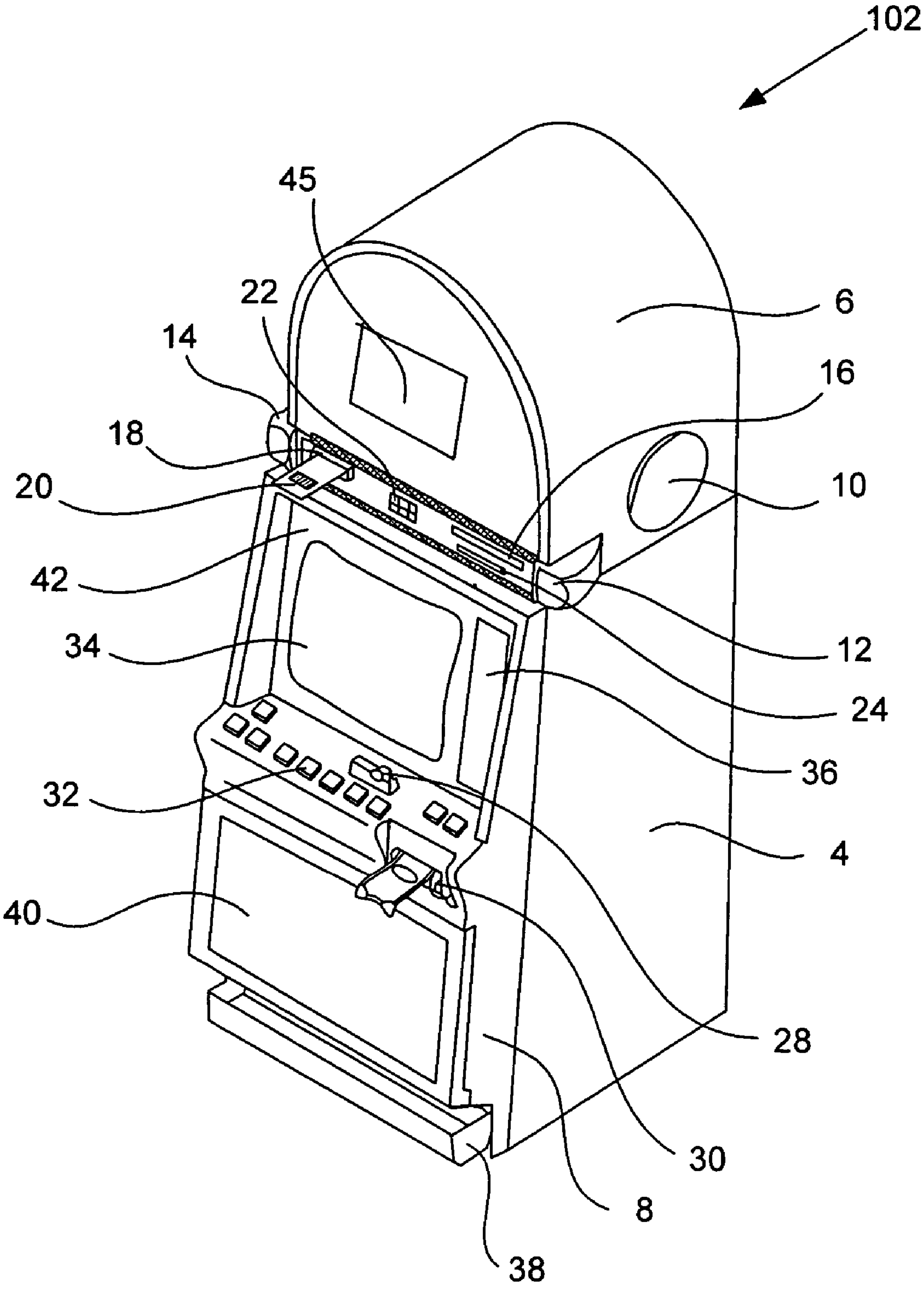
FIG. 10 illustrates a gaming machine that may be configured according to some aspects of the invention.

Turning next to FIG. 10, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 10. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 10, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 11:
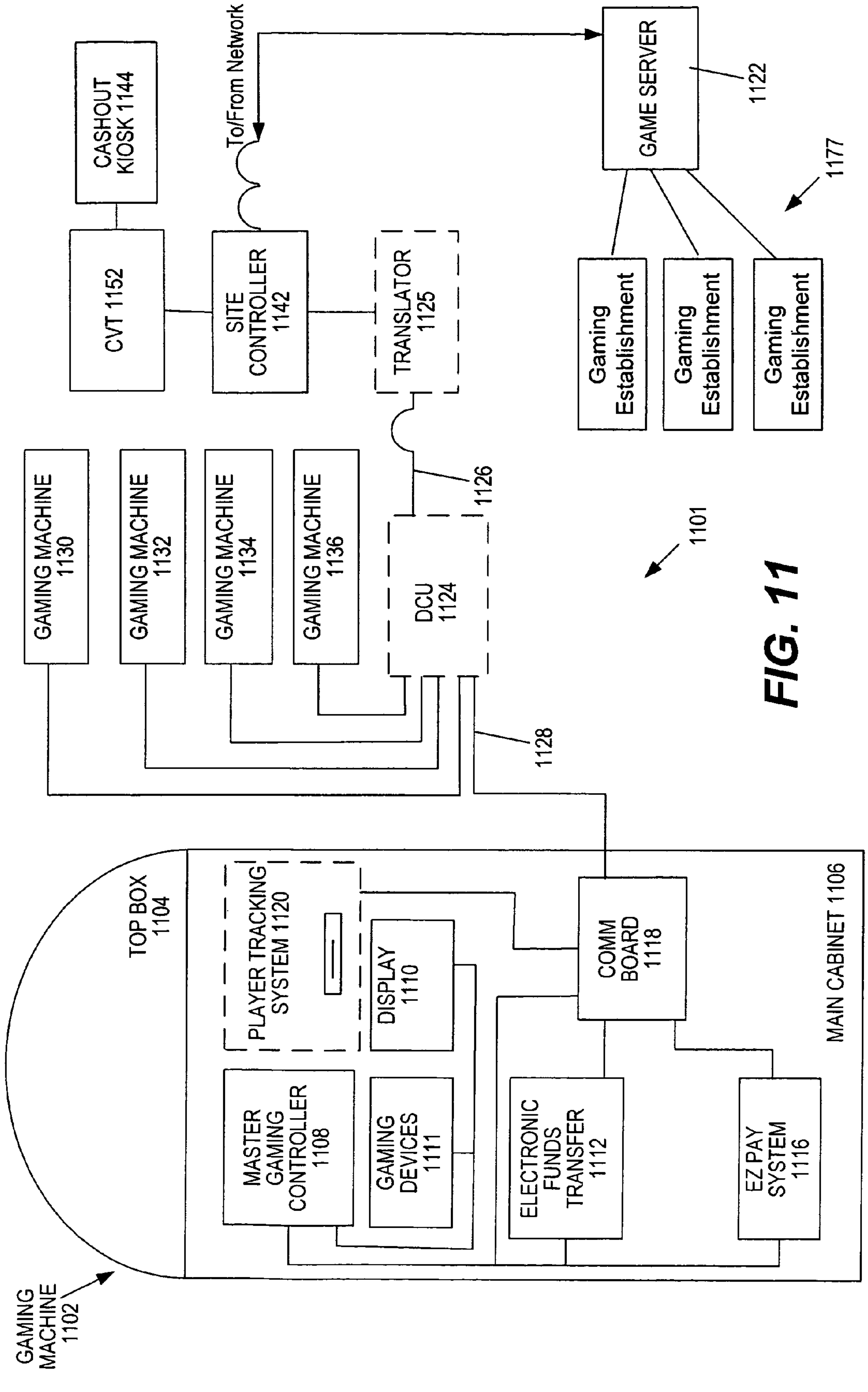
FIG. 11 illustrates a gaming machine and a gaming network that may be configured according to some aspects of the invention.

A gaming network that may be used to implement additional methods performed in accordance with embodiments of the invention is depicted in FIG. 11. Gaming establishment 1101 could be any sort of gaming establishment, such as a casino, a card room, an airport, a store, etc. In this example, gaming network 1177 includes more than one gaming establishment, all of which are networked to game server 1122.

Here, gaming machine 1102, and the other gaming machines 1130, 1132, 1134, and 1136, include a main cabinet 1106 and a top box 1104. The main cabinet 1106 houses the main gaming elements and can also house peripheral systems, such as those that utilize dedicated gaming networks. The top box 1104 may also be used to house these peripheral systems.

The master gaming controller 1108 controls the game play on the gaming machine 1102 according to instructions and/or game data from game server 1122 or stored within gaming machine 1102 and receives or sends data to various input/output devices 1111 on the gaming machine 1102. In one embodiment, master gaming controller 1108 includes processor(s) and other apparatus of the gaming machines described above in FIGS. 6 and 7. The master gaming controller 1108 may also communicate with a display 1110.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1108 may also communicate with EFT system 1112, EZPay™ system 1116 (a proprietary cashless ticketing system of the present assignee), and player tracking system 1120. The systems of the gaming machine 1102 communicate the data onto the network 1122 via a communication board 1118.

It will be appreciated by those of skill in the art that embodiments of the present invention could be implemented on a network with more or fewer elements than are depicted in FIG. 11. For example, player tracking system 1120 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1124 and translator 1125 are not required for all gaming establishments 1101. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1142 provides this function for gaming establishment 1101. Site controller 1142 is connected to a central system and/or other gaming establishments via one or more networks, which may be public or private networks. Among other things, site controller 1142 communicates with game server 1122 to obtain game data, such as ball drop data, bingo card data, etc.

In the present illustration, gaming machines 1102, 1130, 1132, 1134 and 1136 are connected to a dedicated gaming network 1122. In general, the DCU 1124 functions as an intermediary between the different gaming machines on the network 1122 and the site controller 1142. In general, the DCU 1124 receives data transmitted from the gaming machines and sends the data to the site controller 1142 over a transmission path 1126. In some instances, when the hardware interface used by the gaming machine is not compatible with site controller 1142, a translator 1125 may be used to convert serial data from the DCU 1124 to a format accepted by site controller 1142. The translator may provide this conversion service to a plurality of DCUs.

Further, in some dedicated gaming networks, the DCU 1124 can receive data transmitted from site controller 1142 for communication to the gaming machines on the gaming network. The received data may be, for example, communicated synchronously to the gaming machines on the gaming network.

Here, CVT 1152 provides cashless and cashout gaming services to the gaming machines in gaming establishment 1101. Broadly speaking, CVT 1152 authorizes and validates cashless gaming machine instruments (also referred to herein as "tickets" or "vouchers"), including but not limited to tickets for causing a gaming machine to display a game result and cash-out tickets. Moreover, CVT 1152 authorizes the exchange of a cashout ticket for cash. These processes will be described in detail below. In one example, when a player attempts to redeem a cash-out ticket for cash at cashout kiosk 1144, cash out kiosk 1144 reads validation data from the cashout ticket and transmits the validation data to CVT 1152 for validation. The tickets may be printed by gaming machines, by cashout kiosk 1144, by a stand-alone printer, by CVT 1152, etc. Some gaming establishments will not have a cashout kiosk 1144. Instead, a cashout ticket could be redeemed for cash by a cashier (e.g. of a convenience store), by a gaming machine or by a specially configured CVT.

Figure 12:
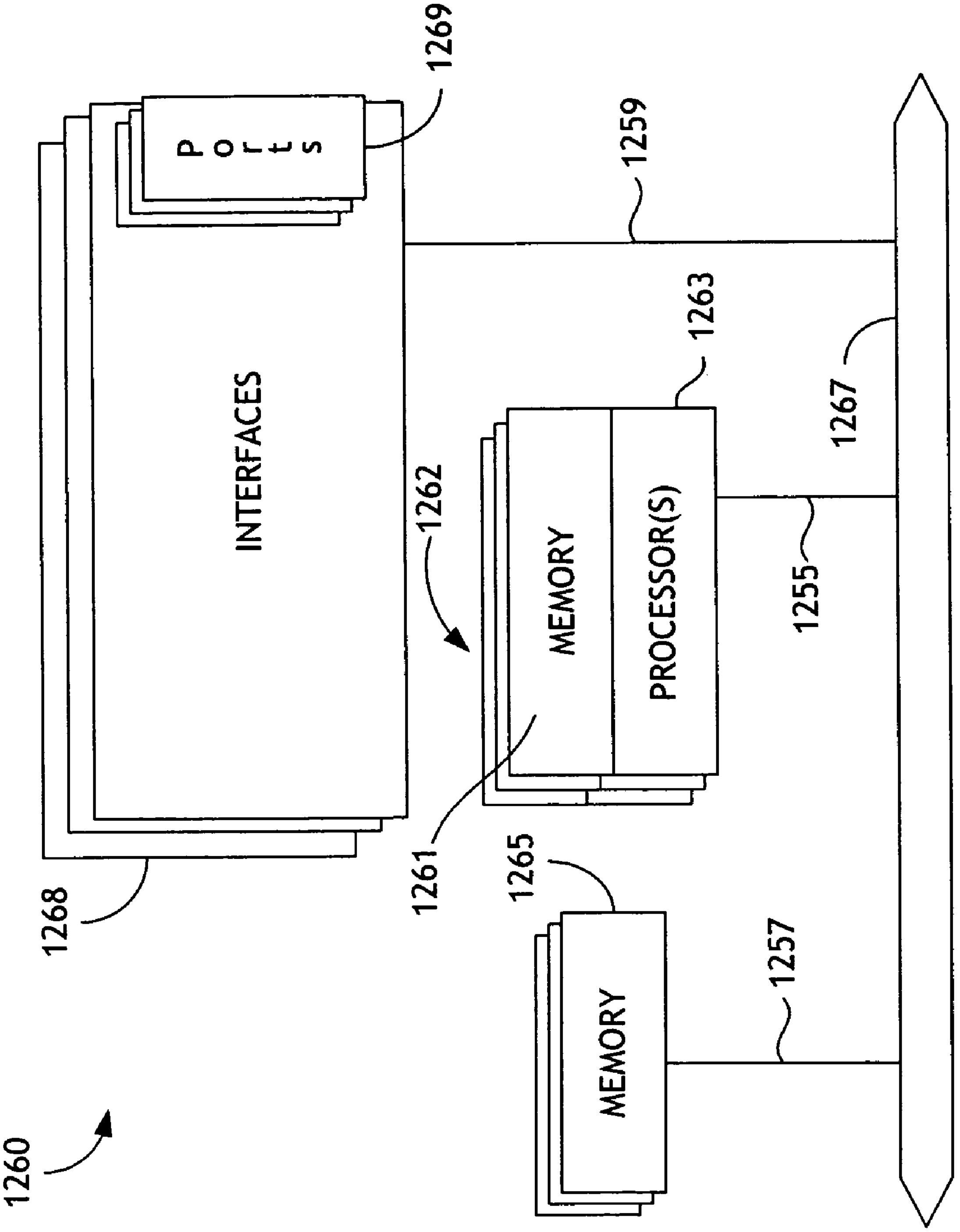
FIG. 12 illustrates a network device that may be configured according to some aspects of the invention.

FIG. 12 illustrates an example of a network device that may be configured for implementing some methods of the present invention. Network device 1260 includes a master central processing unit (CPU) 1262, interfaces 1268, and a bus 1267 (e.g., a PCI bus). Generally, interfaces 1268 include ports 1269 appropriate for communication with the appropriate media. In some embodiments, one or more of interfaces 1268 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1268 control such communications-intensive tasks as encryption, decryption, compression, decompression, packetization, media control and management. By providing separate processors for the communications-intensive tasks, interfaces 1268 allow the master microprocessor 1262 efficiently to perform other functions such as routing computations, network diagnostics, security functions, etc.

The interfaces 1268 are typically provided as interface cards (sometimes referred to as "linecards"). Generally, interfaces 1268 control the sending and receiving of data packets over the network and sometimes support other peripherals used with the network device 1260. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1262 may be responsible for implementing specific functions associated with the functions of a desired network device. According to some embodiments, CPU 1262 accomplishes all these functions under the control of software including an operating system and any appropriate applications software.

CPU 1262 may include one or more processors 1263 such as a processor from the Motorola family of microprocessors or the MIPS family of microprocessors. In an alternative embodiment, processor 1263 is specially designed hardware for controlling the operations of network device 1260. In a specific embodiment, a memory 1261 (such as non-volatile RAM and/or ROM) also forms part of CPU 1262. However, there are many different ways in which memory could be coupled to the system. Memory block 1261 may be used for a variety of purposes such as, for example, caching and/or storing data, programming instructions, etc.

Regardless of network device's configuration, it may employ one or more memories or memory modules (such as, for example, memory block 1265) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 12) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method of forming data sets for providing games of chance, the method comprising:

selecting first through $N^{th}$ Class III games; forming a global payout set consisting of a plurality of payout amounts achievable in the first through $N^{th}$ Class III games, wherein each payout amount is associated with one or more target probabilities, wherein each target probability and associated payout amount represent the probability of the associated payout amount occurring in a Class III game in the first through Nth Class III games in which the associated payout amount is achievable;

ranking each payout amount in the global payout set by value;

assigning at least one bingo pattern to each payout amount of the global payout set, thereby forming a global bingo payout set; and calculating a maximum quantity of bingo numbers for each bingo pattern assigned to each payout amount and associated target probability, wherein the probability of obtaining each bingo pattern when the maximum quantity of bingo numbers calculated for the bingo pattern has been drawn is approximately equal to or less than the target probability associated with the payout amount to which the bingo pattern is assigned.

2. The method of claim 1, wherein the probability of obtaining each bingo pattern when the maximum quantity of bingo numbers calculated for the bingo pattern has been drawn is the probability of hitting the bingo pattern without first hitting other bingo patterns which are assigned to payout amounts which are both ranked higher in the global bingo payout set than that bingo pattern and associated with target probabilities associated with the same Class III game as that bingo pattern's associated target probability.

3. The method of claim 1, further comprising:

forming a Class III game payout set for each of the first through $N^{th}$ Class III games, each Class III game payout set including the payout amounts from the plurality of payout amounts which correspond to an individual Class III game; and associating at least one Class III game outcome with each payout amount of each Class III game payout set, thereby forming first through $N^{th}$ theme-specific data sets.

4. The method of claim 1, wherein the assigning step comprises assigning only one bingo pattern to a payout amount of the global payout set and wherein the probability of obtaining a bingo pattern when the maximum quantity of bingo numbers calculated for the bingo pattern and an associated target probability has been drawn is approximately equal to the associated target probability.

5. The method of claim 1, wherein the assigning step comprises assigning more than one bingo pattern to a payout amount of the global payout set and wherein the probability of obtaining a bingo pattern when the maximum quantity of bingo numbers calculated for the bingo pattern and an associated target probability has been drawn is less than the associated target probability and wherein the sum of the probabilities of obtaining the one or more bingo patterns assigned to the payout amount and the associated target probability is less than the associated target probability.

6. The method of claim 3, wherein the calculating step is performed at least once for each Class III game.

7. The method of claim 3, wherein the calculating step is performed for each bet level of each Class III game.

8. The method of claim 3, further comprising:

selecting an additional Class III game;

forming an additional theme-specific data set for the additional Class III game; and determining whether each payout amount achievable in the additional Class III game is a member of the global payout set.

9. The method of claim 8, further comprising the step of forming an updated global bingo payout set when it is determined that at least one payout amount achievable in the additional Class III game is not a member of the global payout set.

10. The method of claim 9, wherein the process of forming an updated global bingo payout set comprises:

assigning a new bingo pattern to each additional payout amount of the additional Class III game not previously included in the global bingo payout set, wherein each additional payout amount is associated with a target probability; and calculating a maximum quantity of bingo numbers for each new bingo pattern assigned to each additional payout amount and associated target probability, wherein the probability of obtaining each new bingo pattern when the maximum quantity of bingo numbers calculated for the new bingo pattern has been drawn is approximately equal to or less than the target probability associated with the additional payout amount to which the new bingo pattern is assigned.

11. Software embodied in a non-transitory machine-readable medium, the software comprising instructions for controlling a device to form data sets for providing games of chance by:

selecting first through $N^{th}$ Class III games;

forming a global payout set consisting of a plurality of payout amounts achievable in the first through $N^{th}$ Class III games, wherein each payout amount is associated with one or more target probabilities, wherein each target probability and associated payout amount represent the probability of the associated payout amount occurring in a Class III game in the first through Nth Class III games in which the associated payout amount is achievable;

ranking each payout amount in the global payout set by value;

assigning at least one bingo pattern to each payout amount of the global payout set, thereby forming a global bingo payout set; and calculating a maximum quantity of bingo numbers for each bingo pattern assigned to each payout amount and associated target probability, wherein the probability of obtaining each bingo pattern when the maximum quantity of bingo numbers calculated for the bingo pattern has been drawn is approximately equal to or less than the target probability associated with the payout amount to which the bingo pattern is assigned.

12. The software of claim 11, wherein the the probability of obtaining each bingo pattern when the maximum quantity of bingo numbers calculated for the bingo pattern has been drawn is the probability of hitting the bingo pattern without first hitting other bingo patterns which are assigned to payout amounts which are both ranked higher in the global bingo payout set than that bingo pattern and associated with target probabilities associated with the same Class III game as that bingo pattern's associated target probability.

13. The software of claim 11, further comprising instructions for controlling the device to form data sets for providing games of chance by:

forming a Class III game payout set for each of the first through $N^{th}$ Class III games, each Class III game payout set including the payout amounts from the plurality of payout amounts which correspond to an individual Class III game; and associating at least one Class III game outcome with each payout amount of each Class III game payout set, thereby forming first through $N^{th}$ theme-specific data sets.

14. The software of claim 11, wherein the assigning step comprises assigning only one bingo pattern to a payout amount of the global payout set and wherein the probability of obtaining a bingo pattern when the maximum quantity of bingo numbers calculated for the bingo pattern and an associated target probability has been drawn is approximately equal to the associated target probability.

15. The software of claim 11, wherein the assigning step comprises assigning more than one bingo pattern to a payout amount of the global payout set and wherein the probability of obtaining a bingo pattern when the maximum quantity of bingo numbers calculated for the bingo pattern and an associated target probability has been drawn is less than the associated target probability and wherein the sum of the probabilities of obtaining the one or more bingo patterns assigned to the payout amount and the associated target probability is less than the associated target probability.

16. The software of claim 13, wherein the calculating step is performed at least once for each Class III game.

17. The software of claim 13, wherein the calculating step is performed for each bet level of each Class III game.

18. The software of claim 13, further comprising instructions for controlling a device to perform the following steps:

selecting an additional Class III game;

forming an additional theme-specific data set for the additional Class III game; and determining whether each payout amount achievable in the additional Class III game is a member of the global payout set.

19. The software of claim 18, further comprising instructions for controlling a device to form an updated global bingo payout set when it is determined that at least one payout amount achievable in the additional Class III game is not a member of the global payout set.

20. The software of claim 19, wherein the process of forming an updated global bingo payout set comprises:

assigning a new bingo pattern to each additional payout amount of the additional Class III game not previously included in the global bingo payout set, wherein each additional payout amount is associated with a target probability; and calculating a maximum quantity of bingo numbers for each new bingo pattern assigned to each additional payout amount and associated target probability, wherein the probability of obtaining each new bingo pattern when the maximum quantity of bingo numbers calculated for the new bingo pattern has been drawn is approximately equal to or less than the target probability associated with the additional payout amount to which the new bingo pattern is assigned.

21. A method of forming data sets for a bingo game, the method comprising:

identifying a plurality of payout amounts, each payout amount associated with a target probability and achievable in a Class III game selected from one or more Class III games;

ranking the payout amounts by value;

assigning one or more bingo patterns to each payout amount and associated target probability, wherein each assigned bingo pattern is associated with a maximum allowable quantity of bingo numbers, wherein achievement of the bingo pattern in a bingo game when no more than the maximum allowable quantity of bingo numbers for the bingo pattern has been drawn results in an award of the payout amount to which the bingo pattern is assigned, and wherein achievement of the bingo pattern in a bingo game when more than the maximum allowable quantity of bingo numbers for the bingo pattern has been drawn will not result in an award of the payout amount to which the bingo pattern is assigned, and wherein the maximum allowable quantity of bingo numbers for a bingo pattern determines a pattern probability of achieving the bingo pattern in a bingo game, calculating the maximum allowable quantity of bingo numbers for each bingo pattern assigned to a payout amount and associated target probability such that the pattern probability is less than or approximately equal to the target probability.

22. The method of claim 21, wherein only one bingo pattern is assigned to a payout amount and associated target probability, and wherein the maximum allowable quantity of bingo numbers for the bingo pattern assigned to the payout amount and associated target probability is calculated such that the pattern probability is approximately equal to the associated target probability.

23. The method of claim 21, wherein more than one bingo pattern is assigned to a payout amount and associated target probability, and wherein the maximum allowable quantity of bingo numbers for each bingo pattern assigned to the payout amount and associated target probability is calculated such that the pattern probability of achieving the bingo pattern is less than the associated target probability.

24. The method of claim 23, wherein the sum of the pattern probabilities for the bingo patterns assigned to the payout amount and associated target probability is approximately equal to the associated target probability.

* * * * *